US012752195B2

(12) United States Patent
Xu

(10) Patent No.: US 12,752,195 B2
(45) Date of Patent: Oct. 6, 2026

(54) SERVICE ACCESS METHOD, TERMINAL, AND SYSTEM

(71) Applicant: Petal Cloud Technology Co., Ltd., Dongguan City (CN)

(72) Inventor: Xin Xu, Dongguan City (CN)

(73) Assignee: Petal Cloud Technology Co., Ltd., Dongguan City (CN)

( * ) Notice: Subject to any disclaimer, the term of this patent is extended or adjusted under 35 U.S.C. 154(b) by 220 days.

(21) Appl. No.: 18/578,934

(22) PCT Filed: Jul. 8, 2022

(86) PCT No.: PCT/CN2022/104729
§ 371 (c)(1),
(2) Date: Jan. 12, 2024

(87) PCT Pub. No.: WO2023/284652
PCT Pub. Date: Jan. 19, 2023

(65) Prior Publication Data

US 2024/0316466 A1 Sep. 26, 2024

(30) Foreign Application Priority Data

Jul. 15, 2021 (CN) ......................... 202110803162.9

(51) Int. Cl.
*A63F 13/792* (2014.01)
*A63F 13/71* (2014.01)

(52) U.S. Cl.
CPC ............ *A63F 13/792* (2014.09); *A63F 13/71* (2014.09)

(58) Field of Classification Search
CPC .................................. G06F 9/45; H04L 67/10
See application file for complete search history.

(56) References Cited

U.S. PATENT DOCUMENTS

2007/0094597 A1* 4/2007 Rostom .................. G06F 9/452
715/700
2012/0064965 A1* 3/2012 Kelly ................. G07F 17/3258
463/25
2019/0314726 A1 10/2019 Masini

FOREIGN PATENT DOCUMENTS

| | | | |
|---|---|---|---|
| CN | 109151068 | A | 1/2019 |
| CN | 111643907 | A | 9/2020 |
| CN | 111773730 | A | 10/2020 |
| CN | 111786948 | A | 10/2020 |
| CN | 111818164 | A | 10/2020 |
| CN | 112783384 | A | 5/2021 |
| CN | 112807678 | A | 5/2021 |
| CN | 113018869 | A | 6/2021 |
| CN | 113746857 | A | 12/2021 |

* cited by examiner

*Primary Examiner* — Ke Xiao
(74) *Attorney, Agent, or Firm* — Slater Matsil, LLP

(57) ABSTRACT

In accordance with an embodiment, a method includes: receiving a first operation performed by a user on a first icon; displaying a first interface in response to the first operation; receiving a second operation performed by the user on the first control; responding to the second operation, where the second operation indicates the first application to send a first request to the terminal; receiving the first request through a first communication channel; and invoking, based on the first request, the second application to implement a function corresponding to the first control.

21 Claims, 30 Drawing Sheets

(1)

(2)

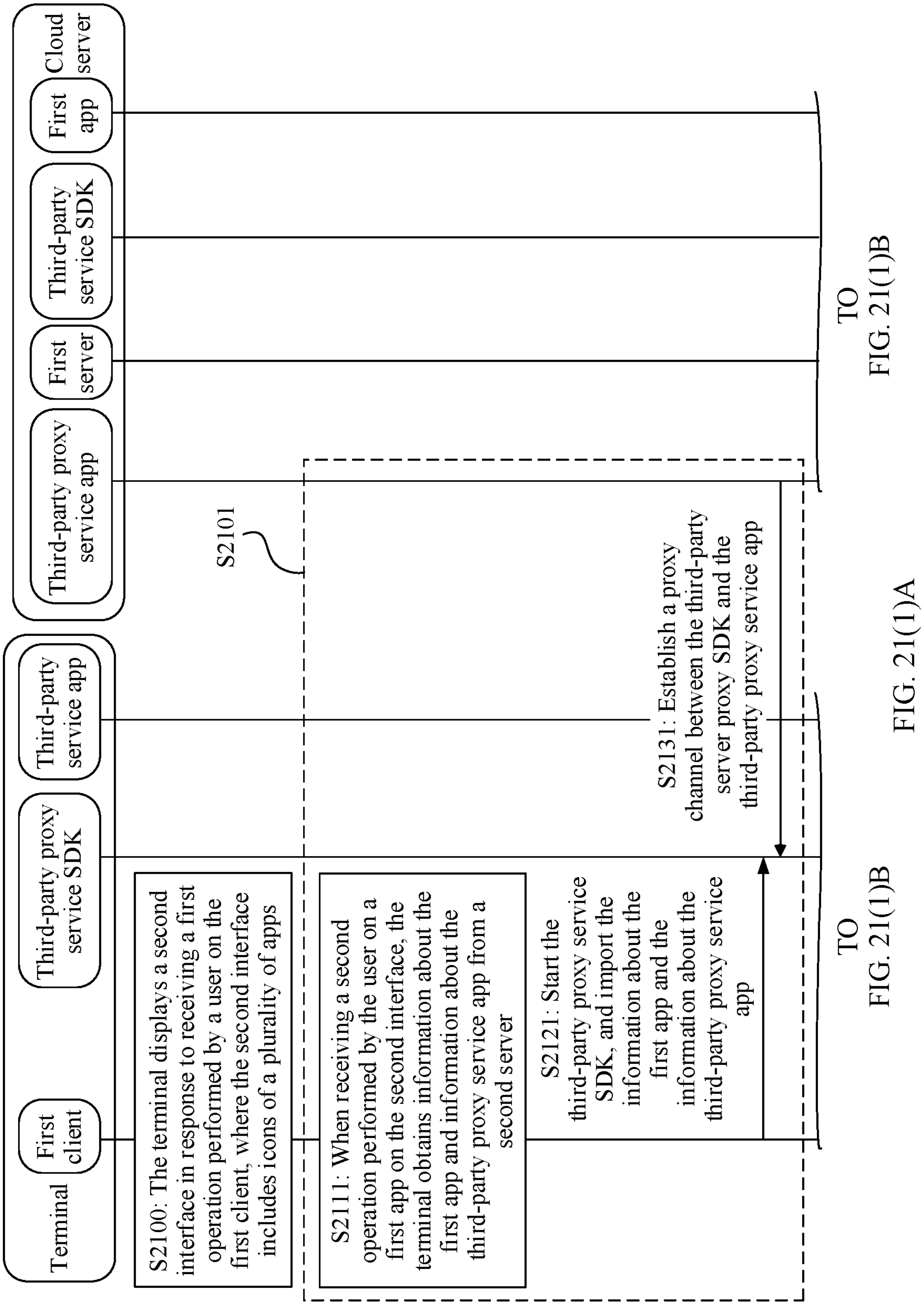
FIG. 21(1)A

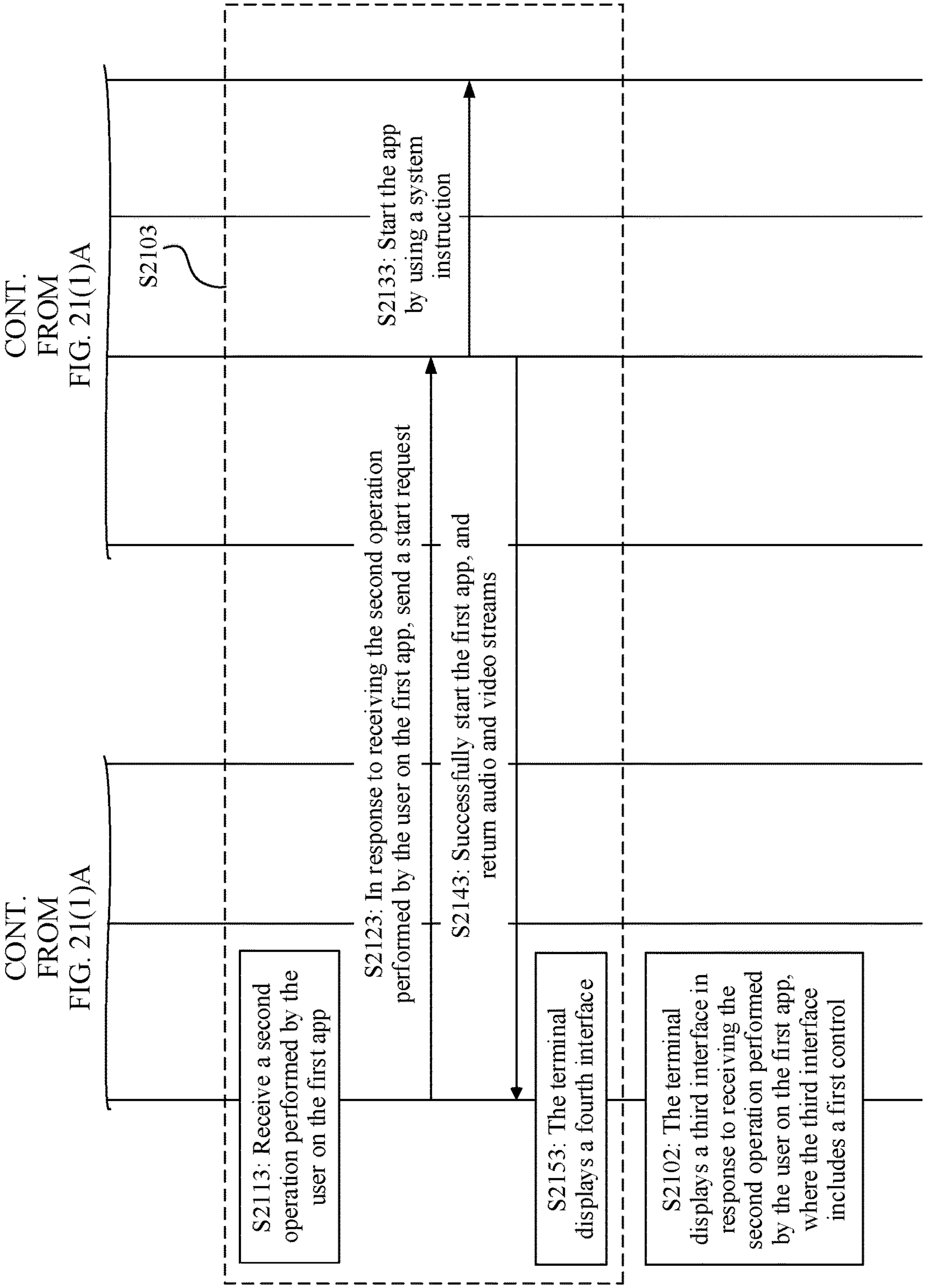
FIG. 21(1)B

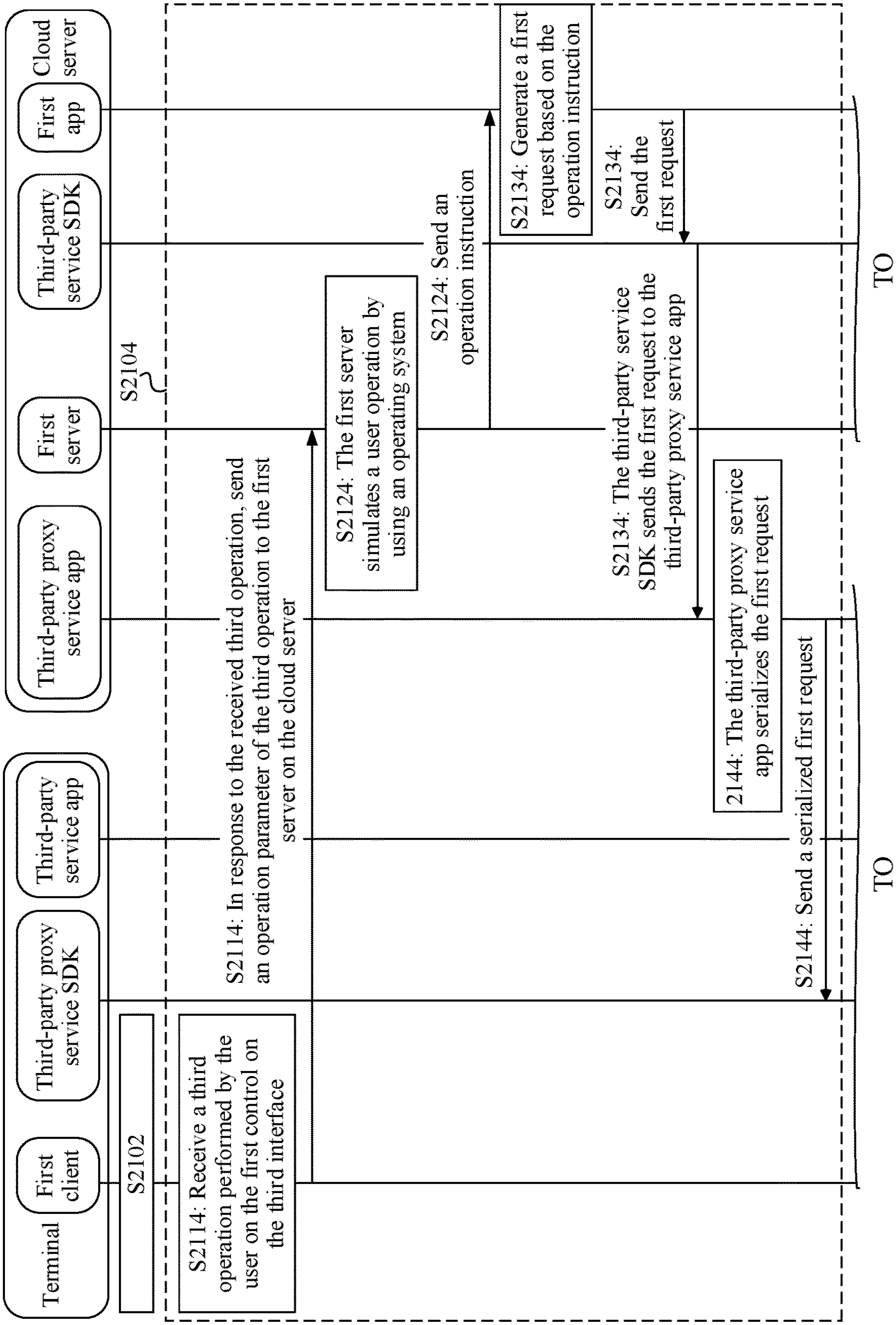
FIG. 21(2)A

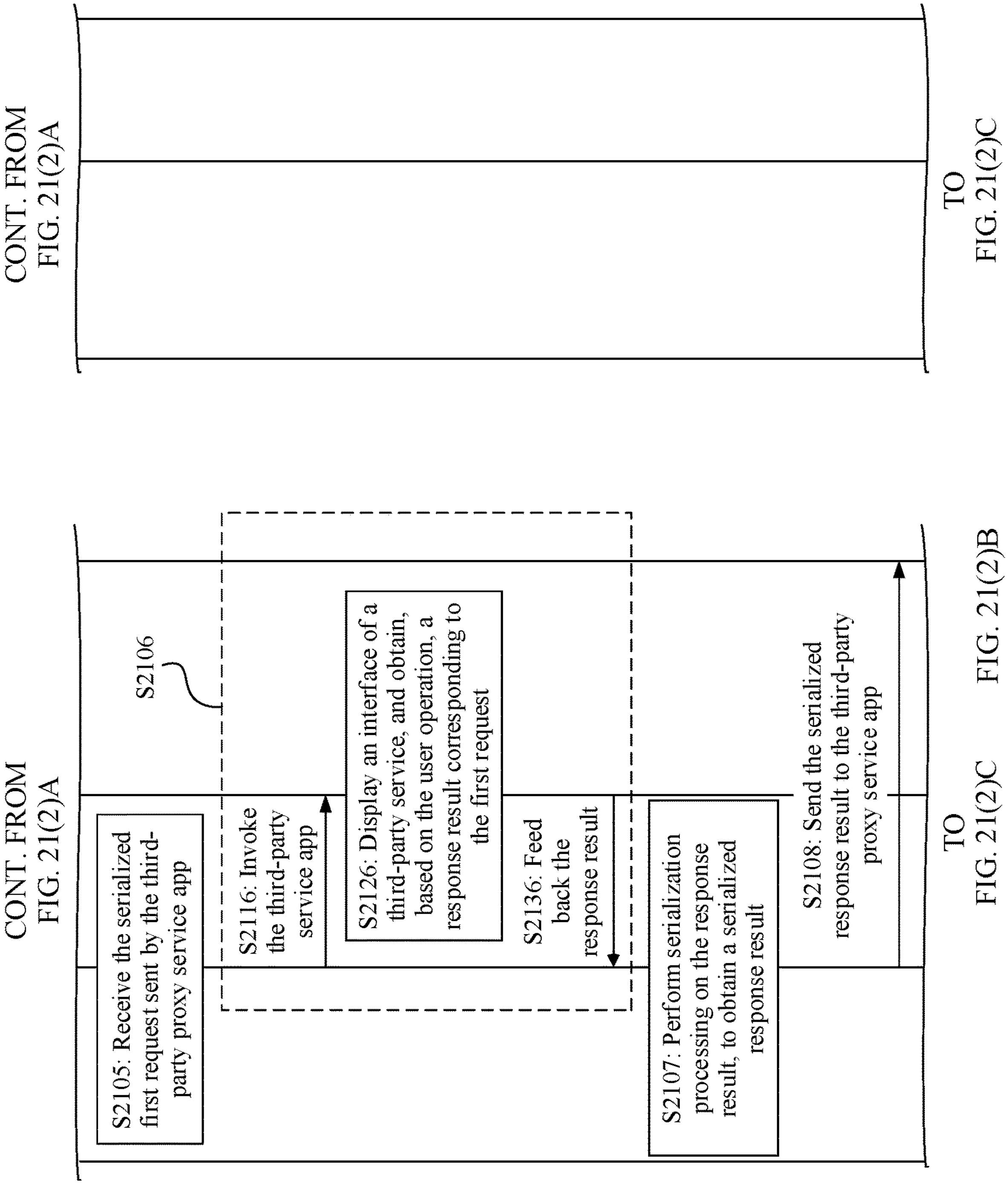
FIG. 21(2)B

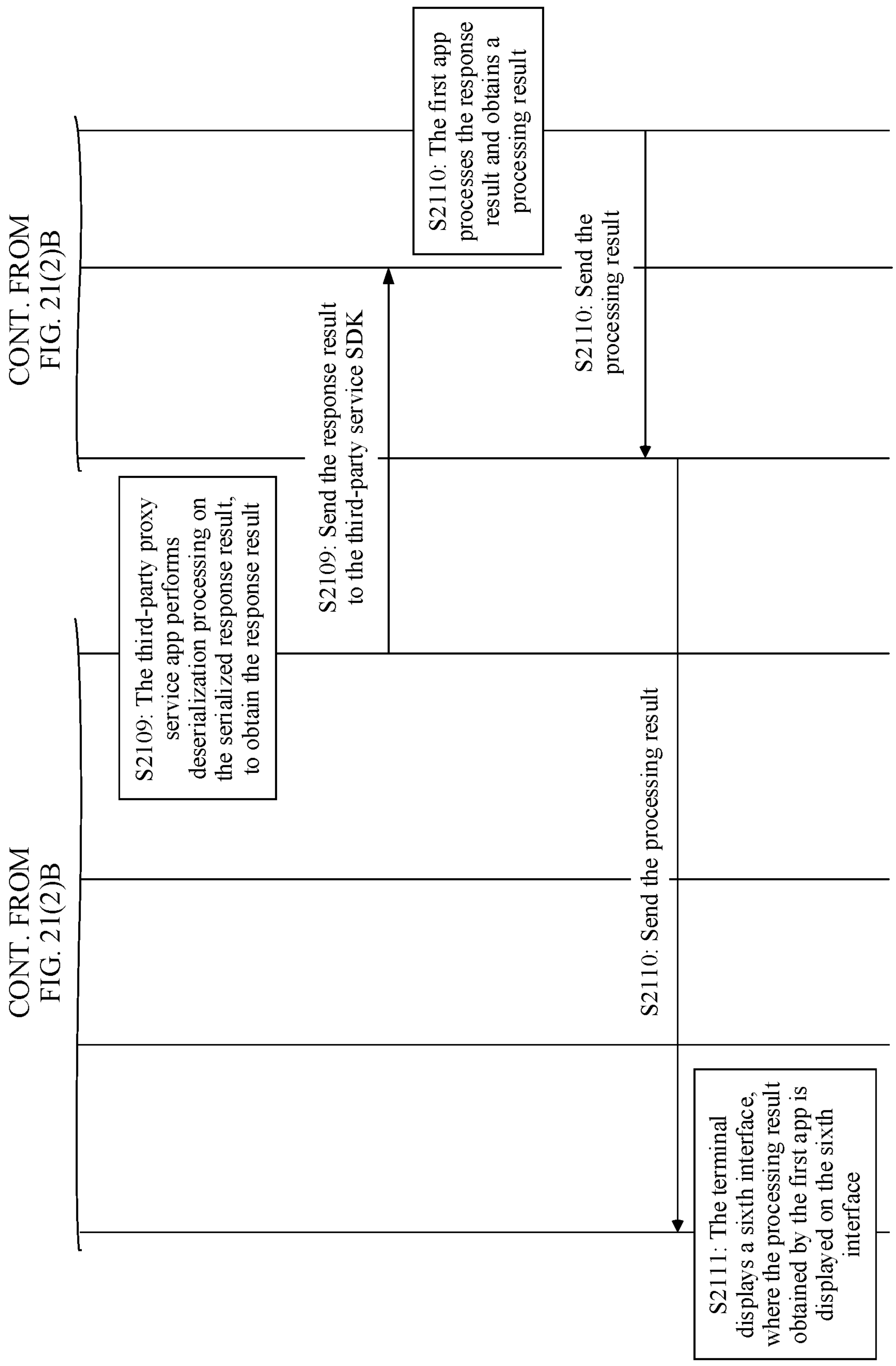
FIG. 21(2)C

SERVICE ACCESS METHOD, TERMINAL, AND SYSTEM

CROSS-REFERENCE TO RELATED APPLICATIONS

This application is a national stage of International Application No. PCT/CN2022/104729, filed on Jul. 8, 2022, which claims priority to Chinese Patent Application No. 202110803162.9 filed on Jul. 15, 2021. Both of the aforementioned applications are hereby incorporated by reference in their entireties.

TECHNICAL FIELD

Embodiments of the present invention relate to the field of communication technologies, and in particular, to a service access method, a terminal, and a system.

BACKGROUND

With development of cloud computing and full application of 5th generation mobile communication technology (5th generation mobile communication technology, 5G) networks, development of cloud services such as a cloud game (cloud game), cloud monitoring, and cloud security is promoted.

The cloud game is used as an example. In a cloud game scenario, a game application (application, APP) runs on a cloud server (namely, a cloud game host, which is alternatively referred to as a cloud phone). The cloud server renders a game scene into video and audio streams, and transmits the video and audio streams to a local device (for example, a mobile phone, a tablet computer, a notebook computer, or a desktop computer) of a user through a network. The local device only needs to have a basic streaming media playing capability and a capability of obtaining a user input instruction and sending the user input instruction to the cloud server. The local device does not need to have powerful graphics operation and data processing capabilities, that is, does not need to be configured with a high-end processor or a high-end graphics card.

A current cloud game login method is usually logging in on the cloud server by using a game account, or logging in on the cloud server through authorization of a third-party application account (third-party account for short) on the cloud server. However, in the foregoing methods, the user needs to enter or save account information on the server. However, there is a security risk when an account is entered on the server. For example, when a terminal is disconnected from the cloud server on a network, there is a case in which the third-party account is in a login state, and there is a risk that the third-party account is used by another person.

SUMMARY

Embodiments of this application provide a service access method, a terminal, and a system, so that an application APP on a cloud server accesses a third-party service application on a local terminal of a user, and account information of the third-party service application does not need to be uploaded to the cloud server, to ensure information security.

To achieve the foregoing objectives, the following technical solutions are used in embodiments of this application.

According to a first aspect, an embodiment of this application provides a service access method. The method may be performed by a terminal, or may be performed by a component (for example, a chip, a chip system, or a processor) located in a terminal. In the following, an example in which the method is performed by the terminal is used for description. The method includes: The terminal receives a first operation performed by the user on a first icon. The terminal displays a first interface in response to the first operation. The first interface is an interface of a first application corresponding to the first icon. The first interface includes a first control used to invoke a second application. The first application is an application running on a server. The terminal receives a second operation performed by the user on the first control. The second operation is responded to, where the second operation indicates the first application to send a first request to the terminal. A first module of the terminal receives the first request through a first communication channel. The first communication channel is a communication channel between the first module and the server. The terminal invokes, based on the first request, the second application to implement a function corresponding to the first control. The second application is an application on the terminal. In this way, the first application on a cloud server accesses the second application on a local terminal of the user, and account information of the second application does not need to be uploaded to the cloud server. This ensures information security.

In some possible implementations, the server is provided with a second module. The first channel is a communication channel between the first module and the second module.

In some possible implementations, after that the terminal displays a first interface in response to the first operation, the method further includes: The first module of the terminal establishes the first communication channel with the server.

In a specific possible implementation, that the terminal establishes the communication channel is specifically as follows: The terminal obtains information about the first application and information about the second module in response to the first operation. The terminal establishes the communication channel based on the information about the first application and the information about the second module.

In some possible implementations, the first request includes a login request, a real-name authentication request, a payment request, an advertisement request, or a push request.

In a specific possible implementation, the first request includes a login request. That the terminal invokes, based on the first request, the second application to implement a function corresponding to the first control is specifically as follows: The terminal displays a second interface based on the login request. The second interface is an interface of the second application. The second interface includes a second control. The second control is used to authorize to log in to the first application by using an account of the second application. The terminal receives a third operation performed by the user on the second control. The terminal obtains, in response to the third operation, a response result fed back by the second application based on the login request.

It can be learned that an application on the cloud server can invoke an application on the local terminal of the user through the communication channel in this embodiment of this application, and the two applications can be applications developed by different vendors. Specifically, for example, the first application is a first cloud game app, the server is a cloud server, and the second application is a third-party service app. The first cloud game app on the cloud server may access the third-party service app on the local terminal of the user, and account information of the third-party service app does not need to be uploaded to the cloud server. This ensures information security.

In addition, in this embodiment of this application, a cloud game operator does not need to apply to a third-party account service provider for permission of proxy game authorization and login. The cloud game login method provided in this embodiment of this application is compatible with various cloud games, and is universal.

In addition, in this embodiment of this application, a game vendor does not need to re-integrate a new third-party account SDK. In other words, an existing cloud game does not need to be modified. This reduces development expenditures and costs.

In some possible implementations, after that the terminal obtains, in response to the third operation, a response result fed back by the second application based on the login request, the method further includes: The first module of the terminal sends the response result to the server through the first communication channel. The server is configured to: obtain interface information of logging in to the first application based on the response result, and feed back the interface information to the terminal. The terminal receives the interface information fed back by the server, and displays a sixth interface based on the interface information.

In a specific possible implementation, the first request includes the payment request. That the terminal invokes, based on the first request, the second application to implement a function corresponding to the first control is specifically as follows: The terminal displays a third interface based on the payment request. The second interface is an interface of the second application. The second interface includes a third control. The third control is used to authorize payment that is based on order information of the first application. The terminal receives a fourth operation performed by the user on the third control. The terminal obtains, in response to the fourth operation, a payment result fed back by the second application based on the payment request.

For example, the first application is a first cloud game app. When an item is purchased on an interface of the first cloud game app, the first cloud game app may invoke a third-party service app on the terminal to complete payment, instead of invoking a third-party service app on a cloud by the cloud server to perform payment. In this way, an application APP on the cloud server accesses the third-party service app on the local terminal of the user.

In some possible implementations, that the terminal obtains, in response to the fourth operation, a payment result fed back by the second application based on the payment request includes: The terminal displays a fourth interface of the second application in response to the fourth operation. The fourth interface includes the payment result of the second application and a fourth control used to return to the first application. The terminal receives a fifth operation performed by the user on the fourth control. The terminal displays a fifth interface of the first application in response to the fifth operation. The payment result is displayed on the fifth interface.

In some possible implementations, before that the terminal displays a first interface in response to the first operation, the method further includes: The terminal displays the fifth interface in response to the first operation. An interface of the first application is displayed on the fifth interface. Video content of the first application is displayed on the interface of the first application.

For example, the first application is the first cloud game app. Before login to the first cloud game app, the terminal displays a game interface of the first cloud game app. In this way, the user can intuitively learn content of the first cloud game app before login to the first cloud game app, instead of first performing login to the first cloud game app and then starting the first cloud game app to learn the content of the first cloud game app. This embodiment of this application better complies with a game login procedure.

In a specific possible implementation, that the second operation is responded to, where the second operation indicates the first application to send a first request to the terminal includes: The terminal sends operation information of the second operation to the server in response to the second operation. The server is configured to: simulate an operation of the user based on the operation information of the second operation, and send an operation instruction to the first application. The operation instruction indicates the first application to send the first request to the terminal.

In a specific possible implementation, the first module is a third-party service proxy software development kit. The second module is a third-party proxy service application.

According to a second aspect, an embodiment of this application provides a system. The system includes: a terminal, configured to: receive a first operation performed by a user on a first icon; display a first interface in response to the first operation, where the first interface is an interface of a first application corresponding to the first icon, the first interface includes a first control used to invoke a second application, and the first application is an application running on a server; receive a second operation performed by the user on the first control; and send operation information of the second operation to the server in response to the second operation; and the server, configured to: receive the operation information of the second operation, and generate a first operation instruction, where the first operation instruction indicates the first application to send a first request to the terminal. The terminal is further configured to: receive the first request through a first communication channel by using a first module of the terminal, where the first communication channel is a communication channel between the first module and the server; and invoke, based on the first request, the second application to implement a function corresponding to the first control, where the second application is an application on the terminal. In this way, the first application on a cloud server accesses the second application on a local terminal of the user, and account information of the second application does not need to be uploaded to the cloud server. This ensures information security.

In some possible implementations, the server is provided with a second module. The first channel is a communication channel between the first module and the second module.

In some possible implementations, in response to the first operation, the terminal is further configured to establish the first communication channel between the first module and the server.

In a specific possible implementation, the terminal is further configured to: obtain information about the first application and information about the second module in response to the first operation, and establish the communication channel based on the information about the first application and the information about the second module.

In a specific possible implementation, the first request includes a login request, a real-name authentication request, a payment request, an advertisement request, or a push request.

In a specific possible implementation, the first request includes the login request. The terminal is further configured to: display a second interface based on the login request, where the second interface is an interface of the second application, the second interface includes a second control, and the second control is used to authorize to log in to the first application by using an account of the second application; receive a third operation performed by the user on the second control; and obtain, in response to the third operation, a response result fed back by the second application based on the login request.

It can be learned that an application on the cloud server can invoke an application on the local terminal of the user through the communication channel in this embodiment of this application, and the two applications can be applications developed by different vendors. Specifically, for example, the first application is a first cloud game app, the server is a cloud server, and the second application is a third-party service app. The first cloud game app on the cloud server may access the third-party service app on the local terminal of the user, and account information of the third-party service app does not need to be uploaded to the cloud server. This ensures information security.

In addition, in this embodiment of this application, a cloud game operator does not need to apply to a third-party account service provider for permission of proxy game authorization and login. The cloud game login method provided in this embodiment of this application is compatible with various cloud games, and is universal.

In addition, in this embodiment of this application, a game vendor does not need to re-integrate a new third-party account SDK for a game. In other words, an existing game does not need to be modified. This reduces development expenditures and costs.

In some possible implementations, the terminal is further configured to send the response result to the server through the first communication channel by using the first module of the terminal. The server is further configured to: receive the response result by using the first application; log in to the first application based on the response result, and display an interface; and send, to the terminal, interface information of logging in to the first application. The terminal is further configured to: receive the interface information sent by the server, and display a sixth interface based on the interface information.

In a specific possible implementation, the first request includes a payment request. That the terminal invokes, based on the first request, the second application to implement the function corresponding to the first control includes: The terminal displays a third interface based on the payment request. The second interface is an interface of the second application. The second interface includes a third control. The third control is used to authorize payment that is based on order information of the first application. The terminal receives a fourth operation performed by the user on the third control. The terminal obtains, in response to the fourth operation, a payment result fed back by the second application based on the payment request.

For example, the first application is a first cloud game app. When an item is purchased on an interface of the first cloud game app, the first cloud game app may invoke a third-party service app on the terminal to complete payment, instead of invoking a third-party service app on a cloud by the cloud server to perform payment. In this way, an application APP on the cloud server accesses the third-party service app on the local terminal of the user.

In a specific possible implementation, the terminal is further configured to: display a fourth interface of the second application in response to the fourth operation, where the fourth interface includes the payment result of the second application and a fourth control used to return to the first application; receive a fifth operation performed by the user on the fourth control; and send operation information of the fifth operation to the server in response to the fifth operation. The server is further configured to: receive the operation information of the fifth operation, and generate a second operation instruction, where the second operation instruction indicates the first application to display the payment result; and send, to the terminal, interface information that carries the payment result and that is of the first application. The terminal is further configured to: receive the interface information, and display a fifth interface of the first application. The payment result is displayed on the fifth interface.

In some possible implementations, the terminal is further configured to send an obtaining request to the server in response to the first operation. The server is further configured to send the interface information of the first application to the terminal based on the obtaining request. The terminal is further configured to display the fifth interface. An interface of the first application is displayed on the fifth interface. Video content of the first application is displayed on the interface of the first application.

For example, the first application is the first cloud game app. Before login to the first cloud game app, the terminal displays a game interface of the first cloud game app. In this way, the user can intuitively learn content of the first cloud game app before login to the first cloud game app, instead of first performing login to the first cloud game app and then starting the first cloud game app to learn the content of the first cloud game app. This embodiment of this application better complies with a game login procedure.

In a specific possible implementation, the first module is a third-party service proxy software development kit. The second module is a third-party proxy service application.

According to a third aspect, an embodiment of this application provides a terminal, used in the service access method according to the first aspect.

According to a fourth aspect, an embodiment of this application provides a computer-readable storage medium. The computer-readable storage medium includes computer instructions. When the computer instructions are run on a terminal, the terminal is enabled to perform the service access method according to the first aspect.

According to a fifth aspect, an embodiment of this application provides a computer program. When the program is invoked by a processor, the service access method according to the first aspect is performed.

According to a sixth aspect, an embodiment of this application provides a chip system, including one or more processors. When the one or more processors execute instructions, the one or more processors perform the service access method according to the first aspect.

For specific implementations and corresponding technical effects of the embodiments in the second aspect to the sixth aspect, refer to the specific implementations and the technical effects of the first aspect.

BRIEF DESCRIPTION OF THE DRAWINGS

To describe the technical solutions in embodiments of this application more clearly, the following briefly describes the accompanying drawings used for describing embodiments or the conventional technology. It is clear that the accompanying drawings in the following descriptions show merely some embodiments of this application, and a person of ordinary skill in the art may still derive other drawings from these accompanying drawings without creative efforts.

Figure 5:
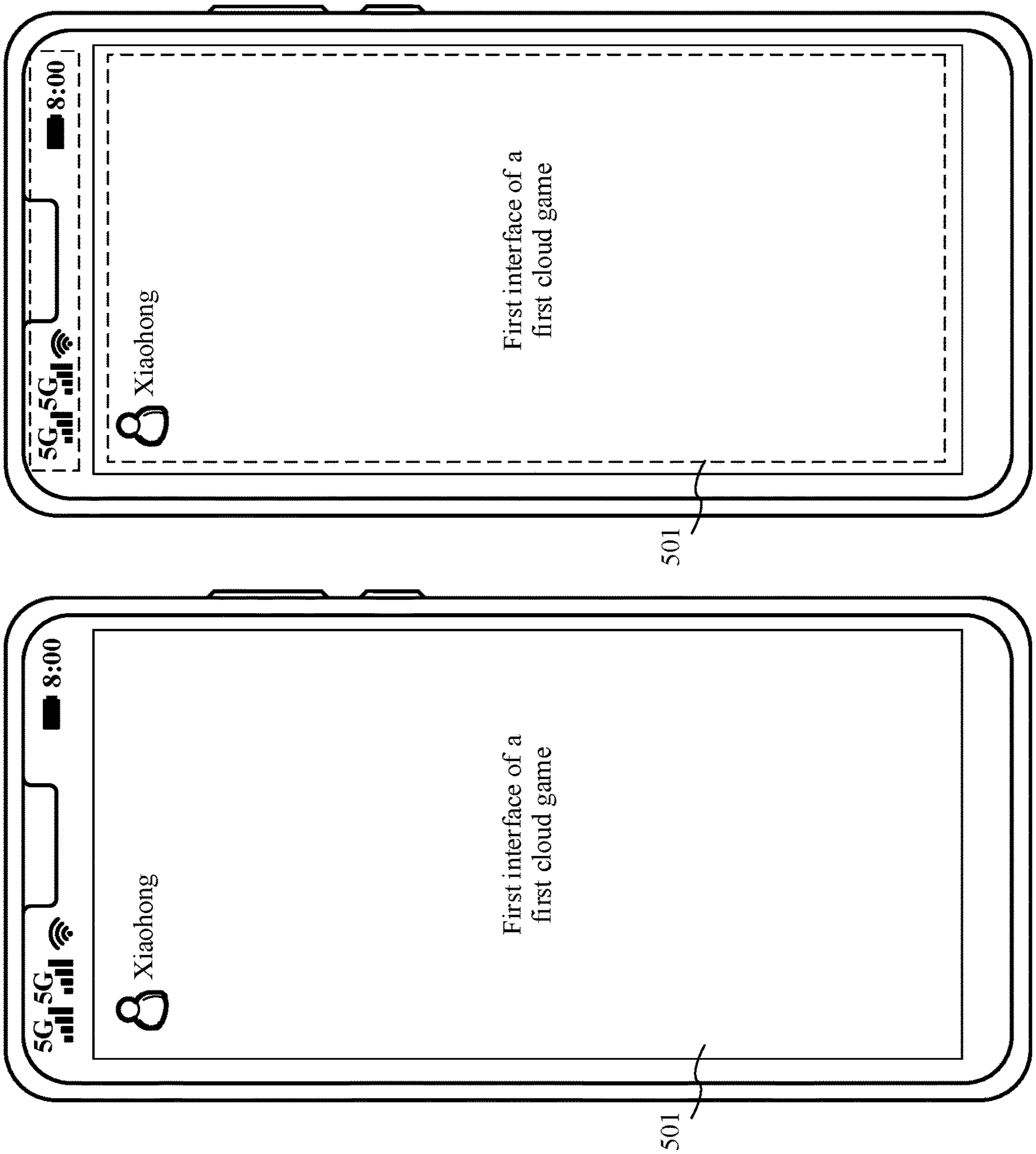
Figure 6:
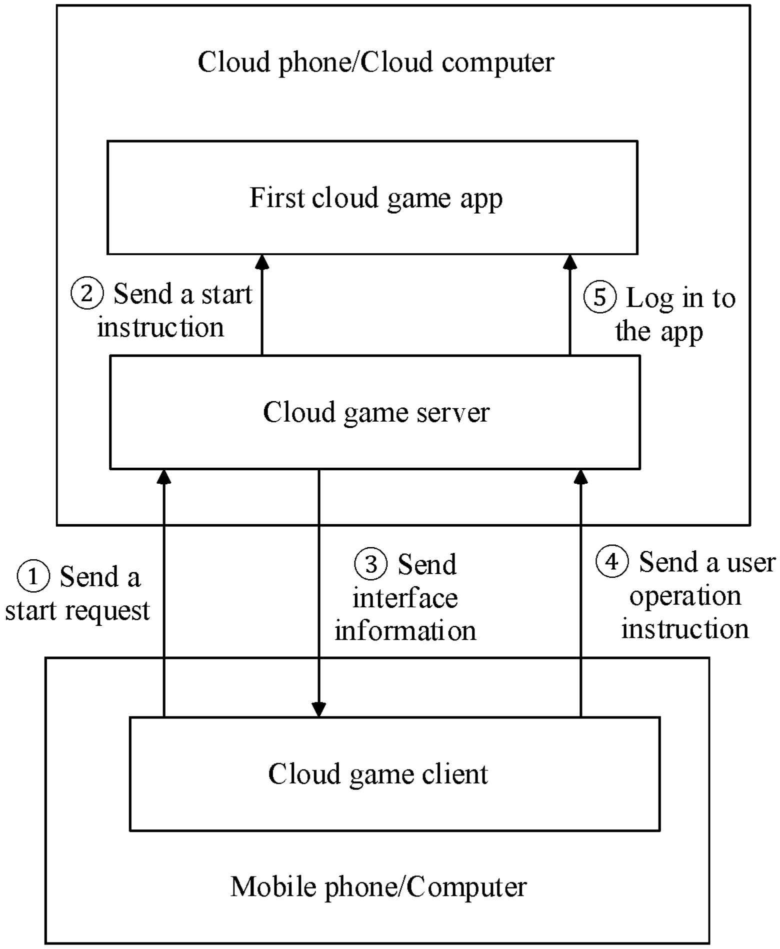
Figure 7A:
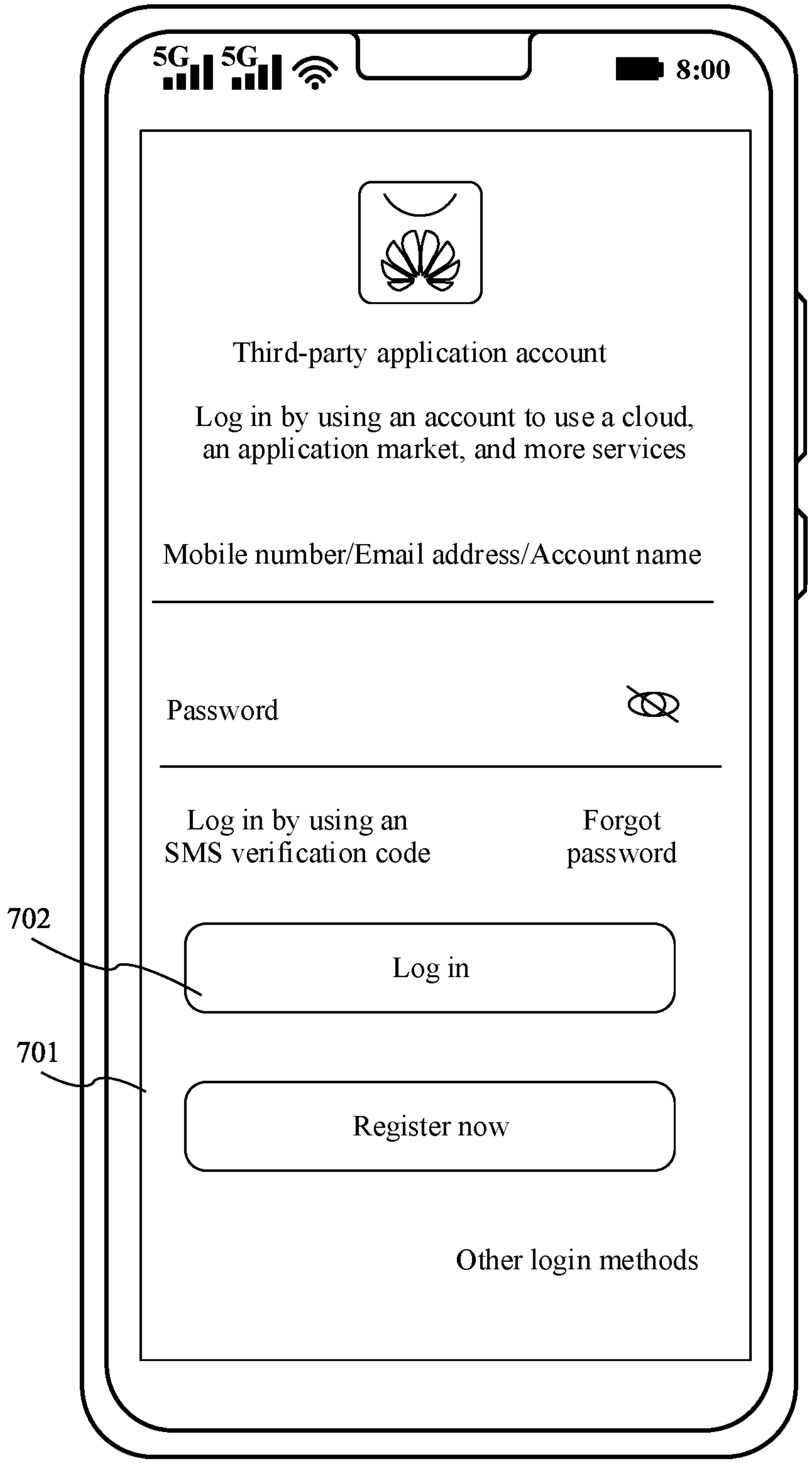
Figure 7B:
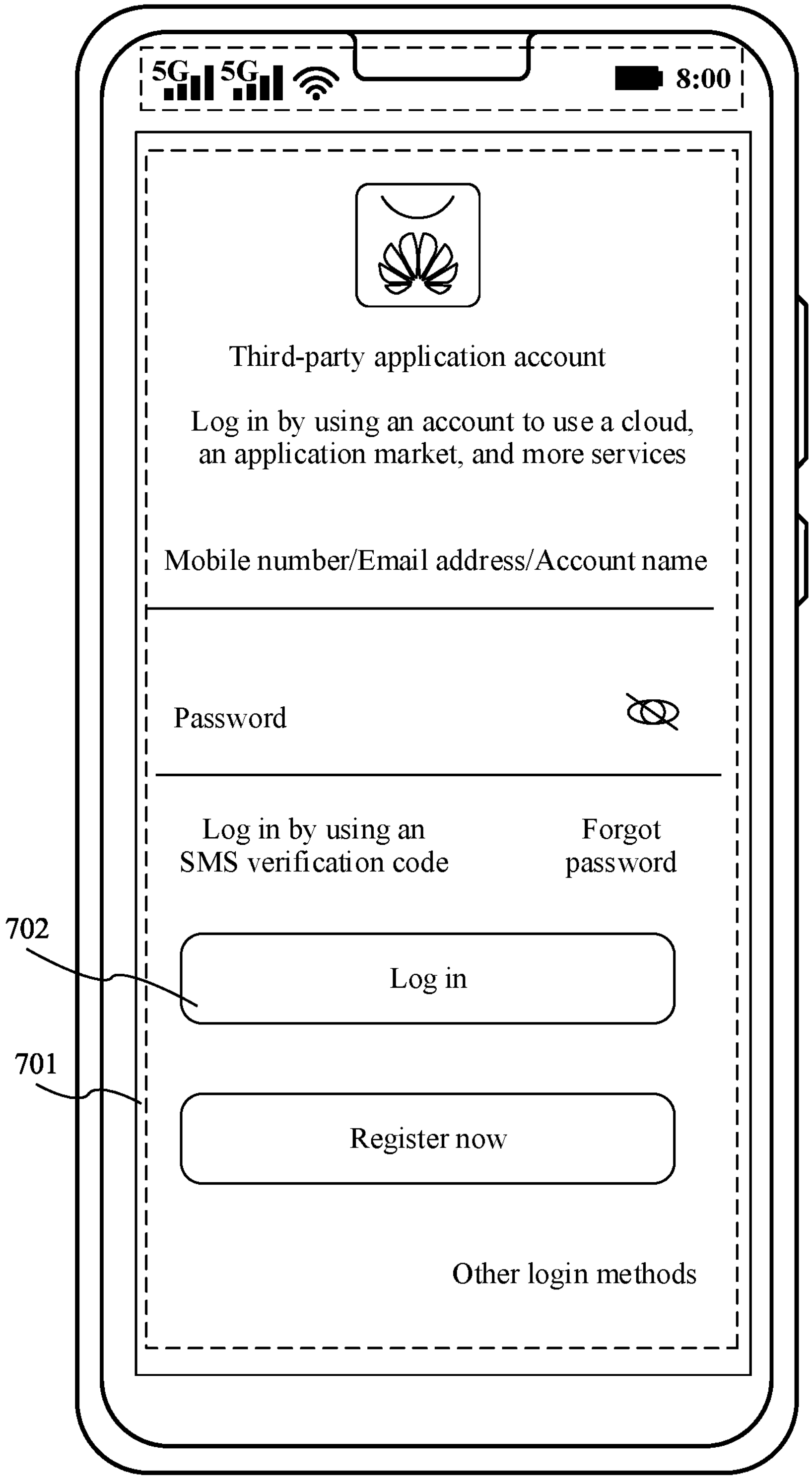
Figure 8:
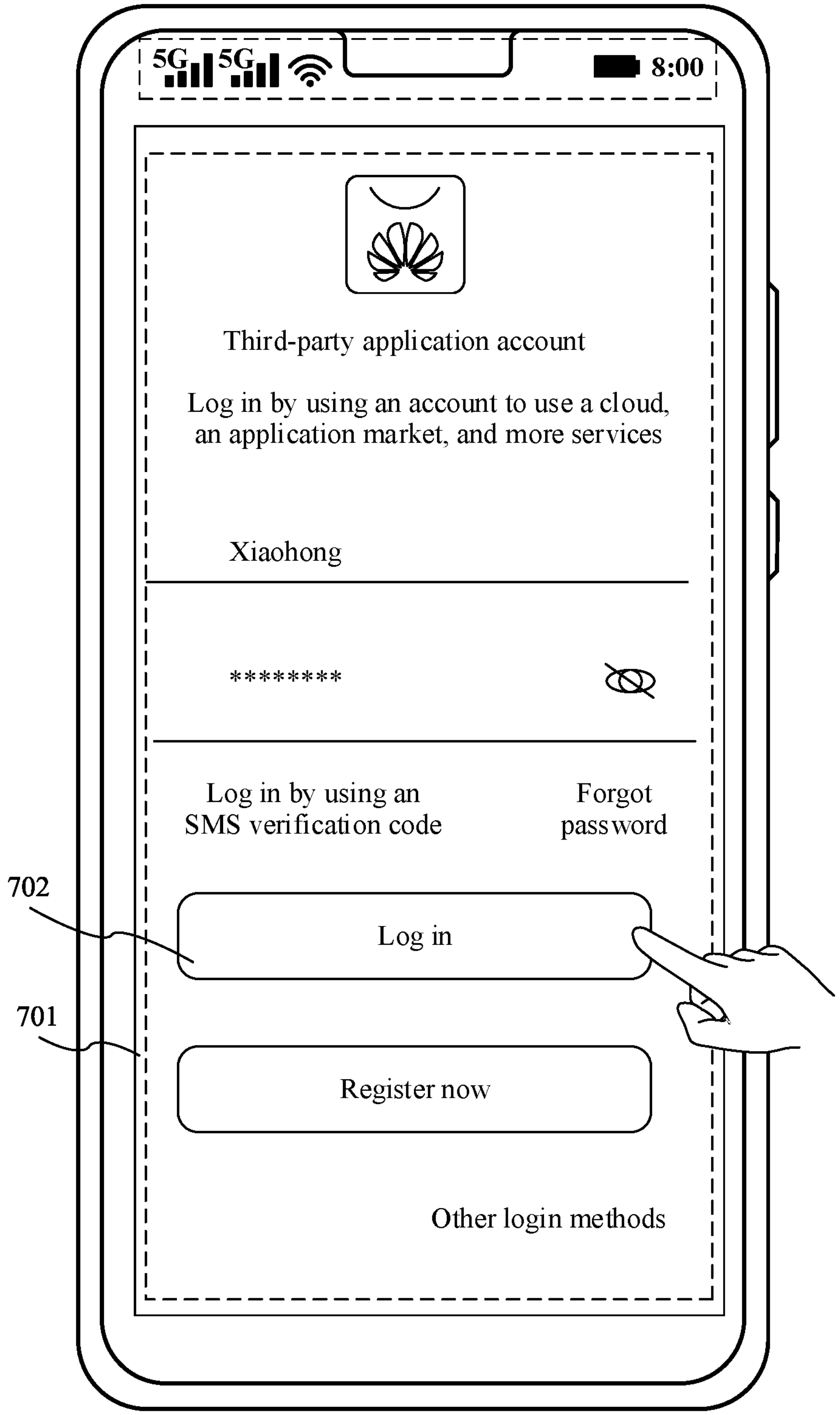
Figure 9:
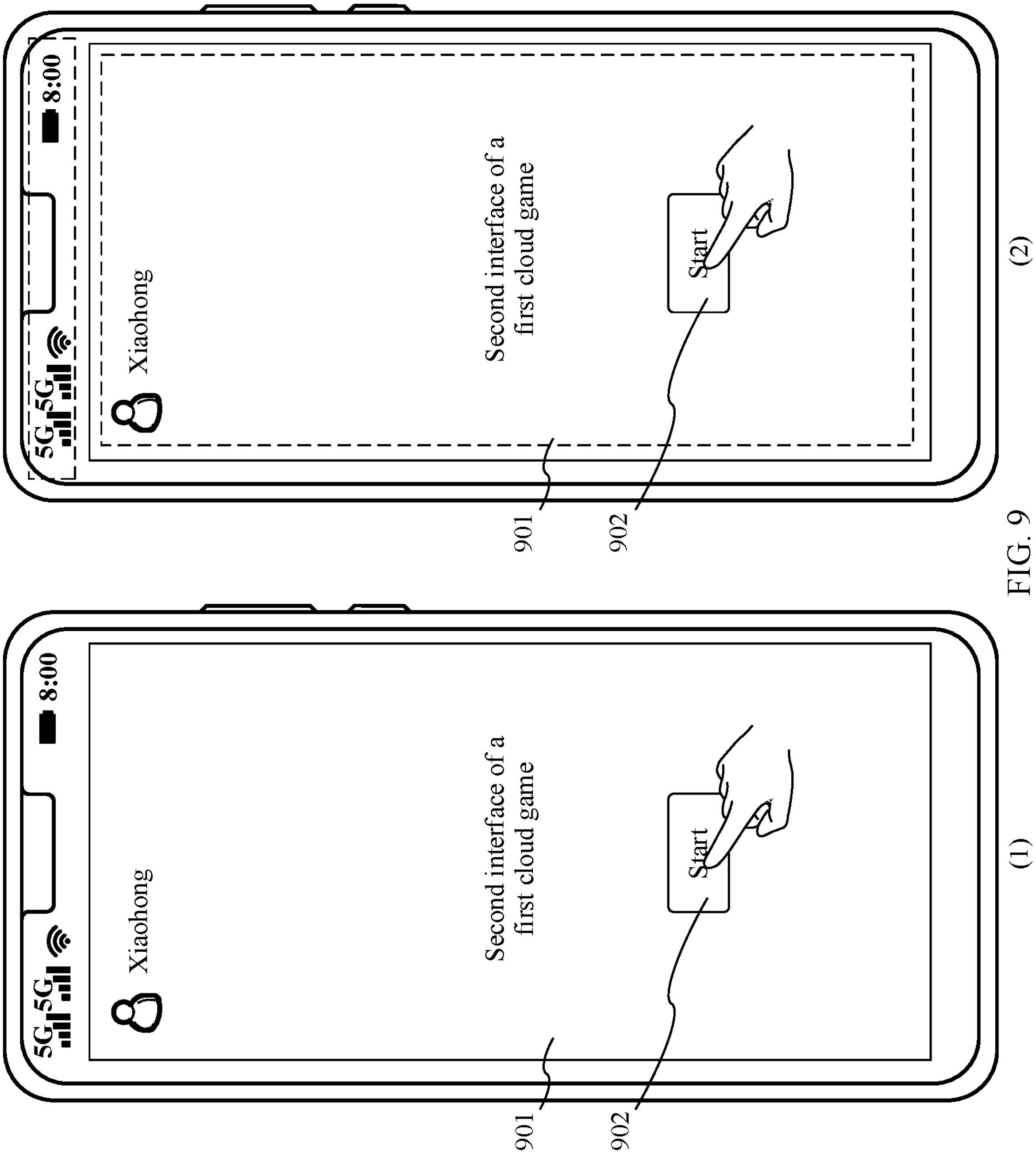
Figure 10:
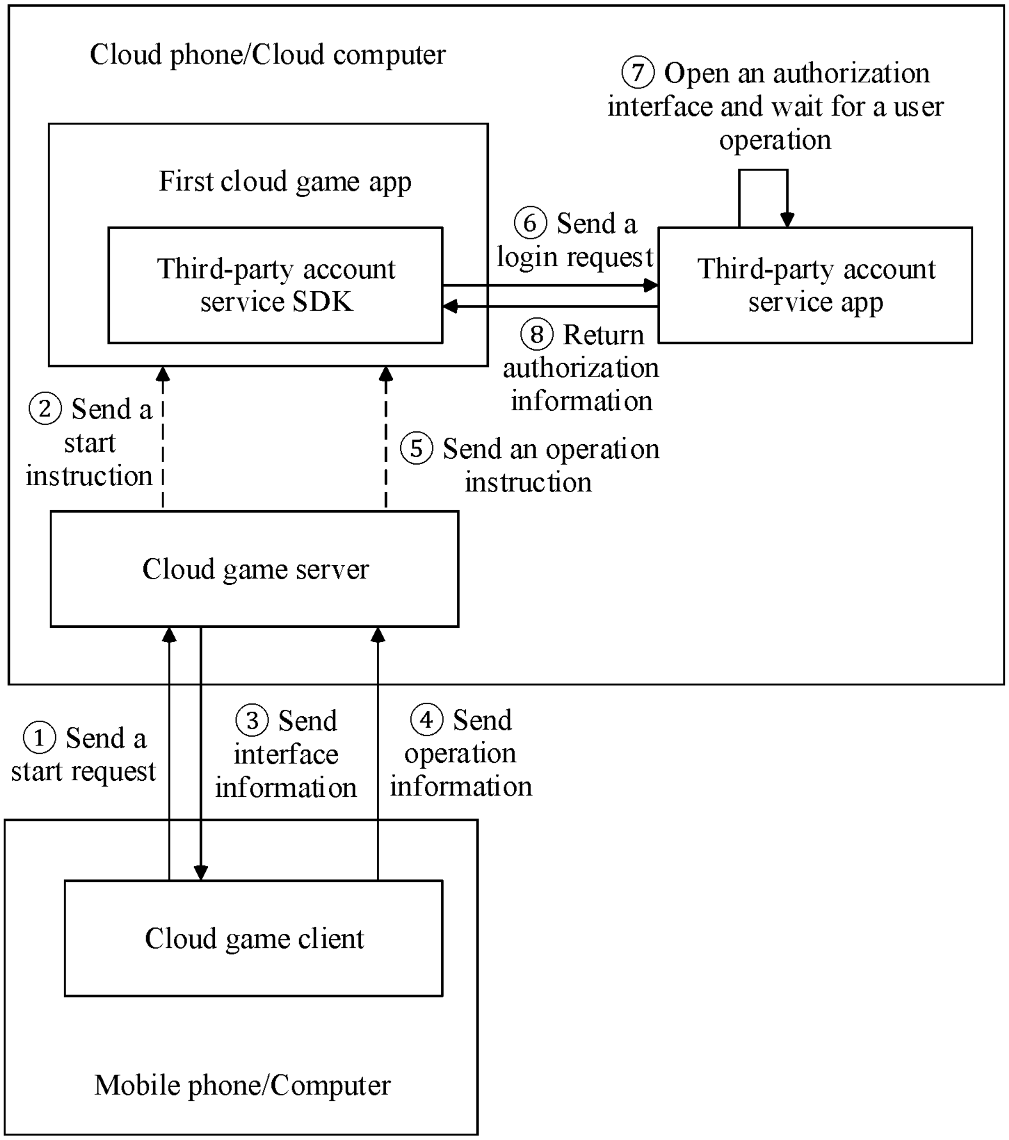
Figure 11:
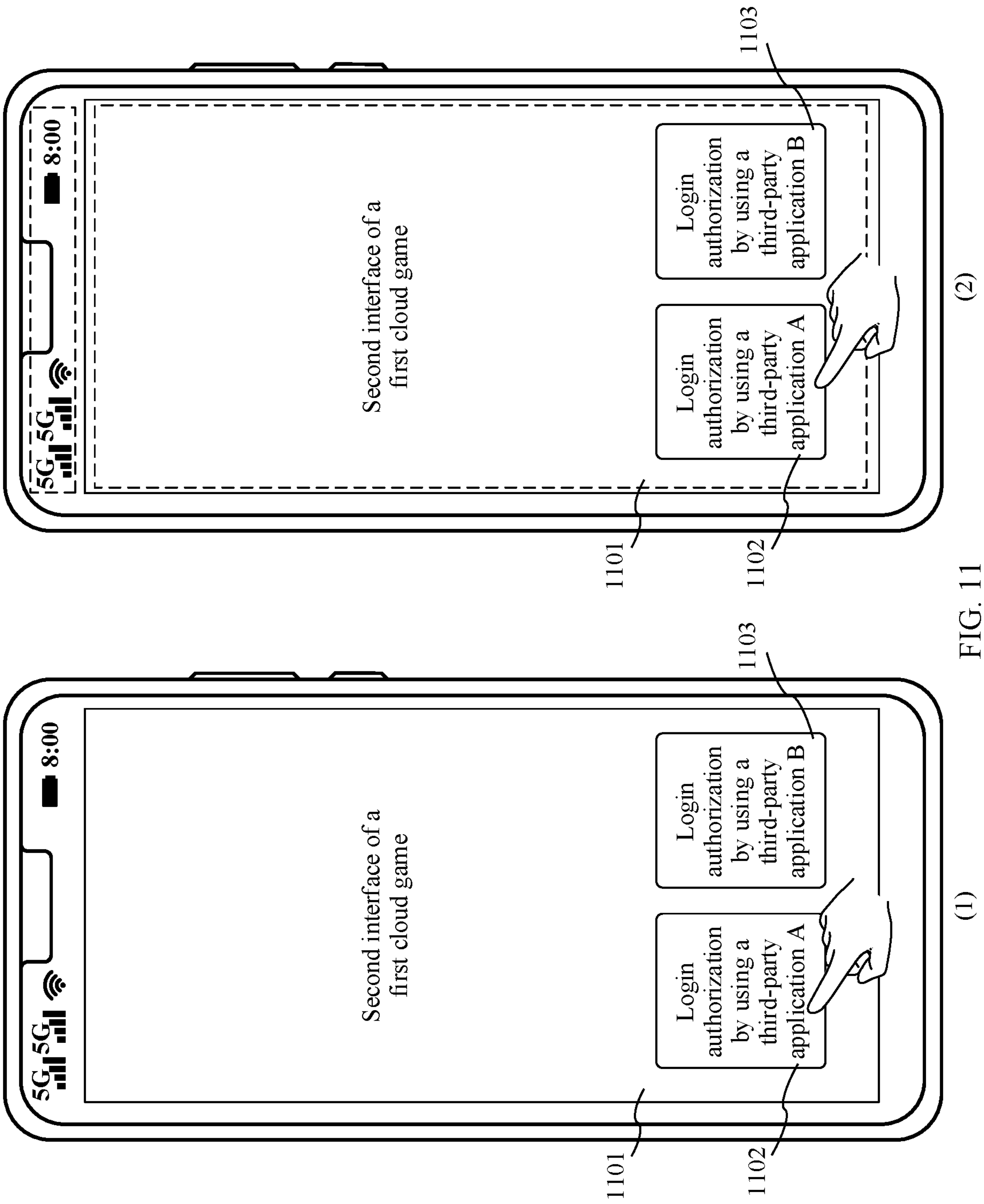
Figure 12A:
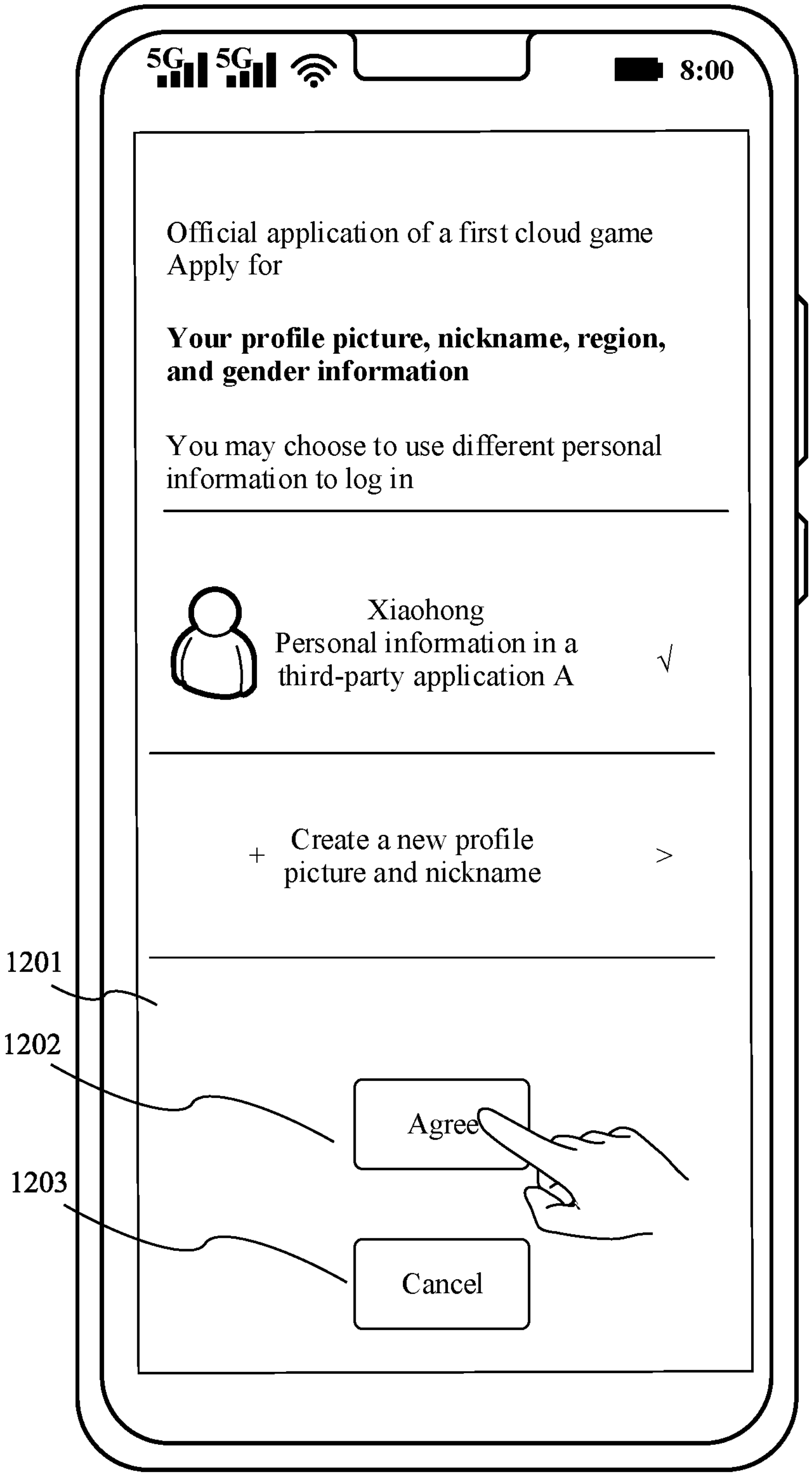
Figure 12B:
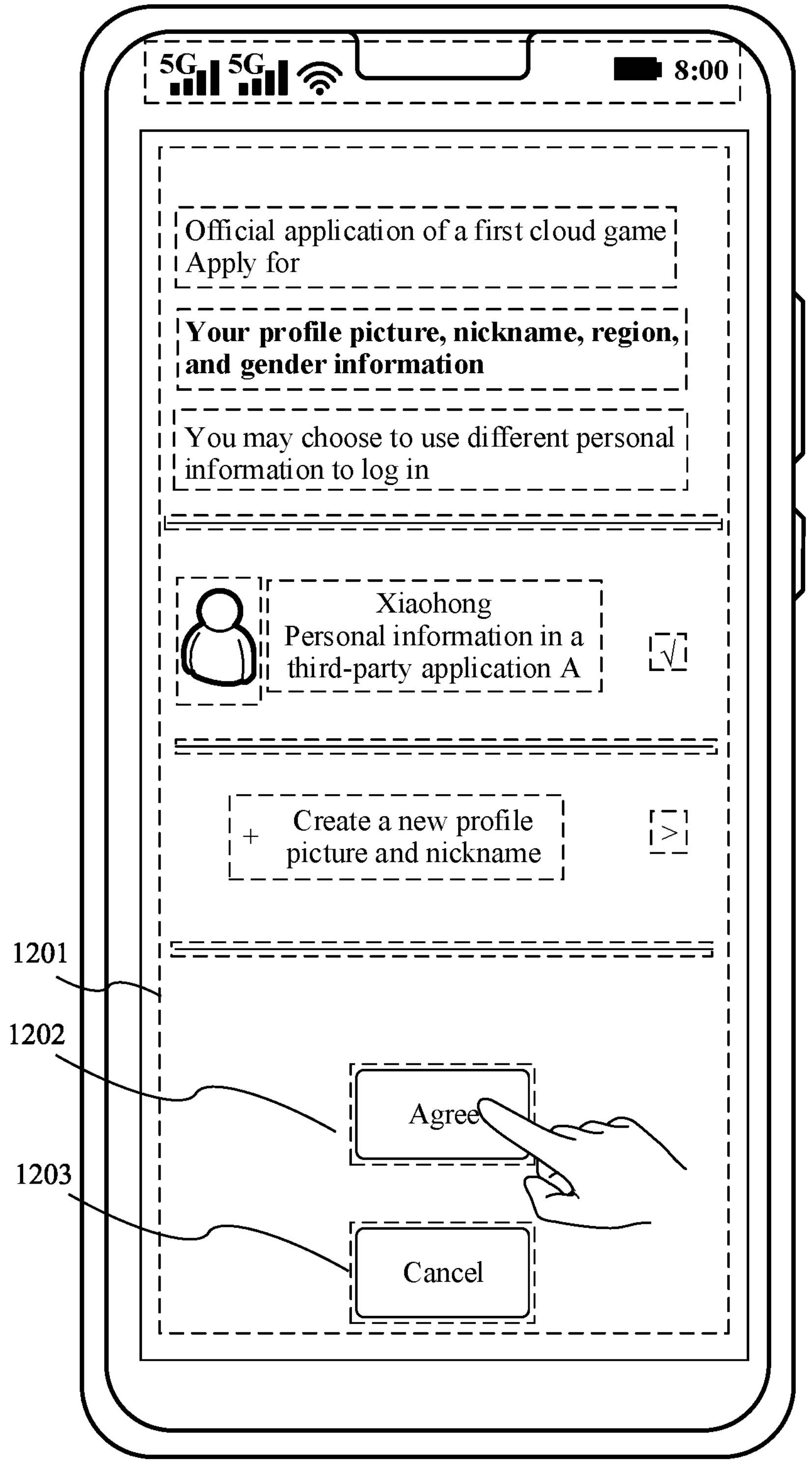
Figure 13A:
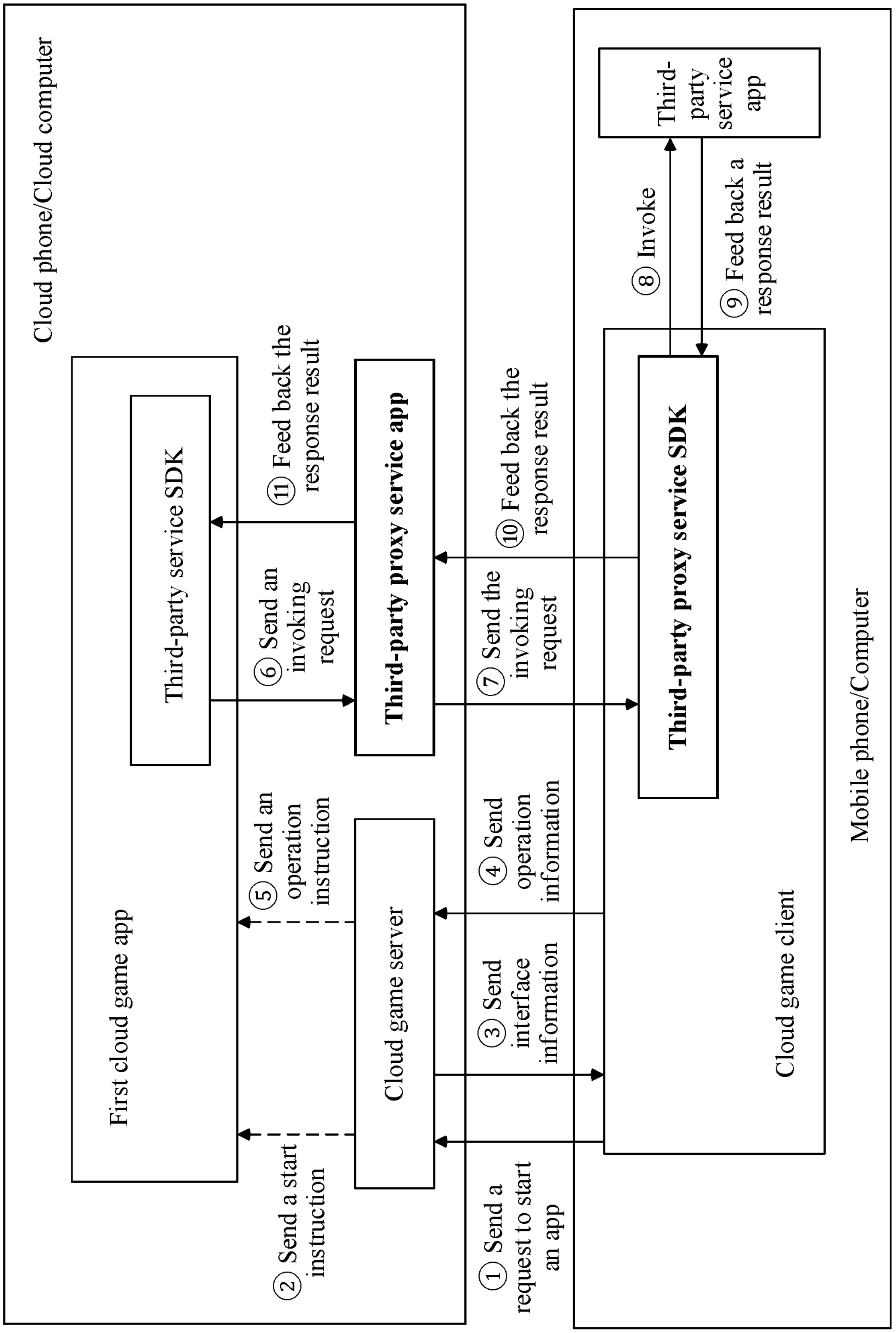
Figure 13B:
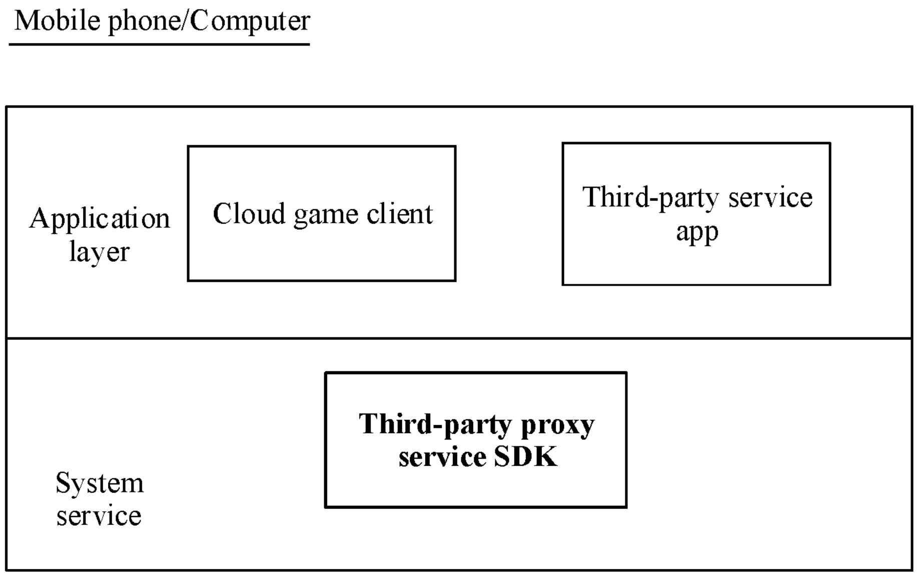
Figure 14:
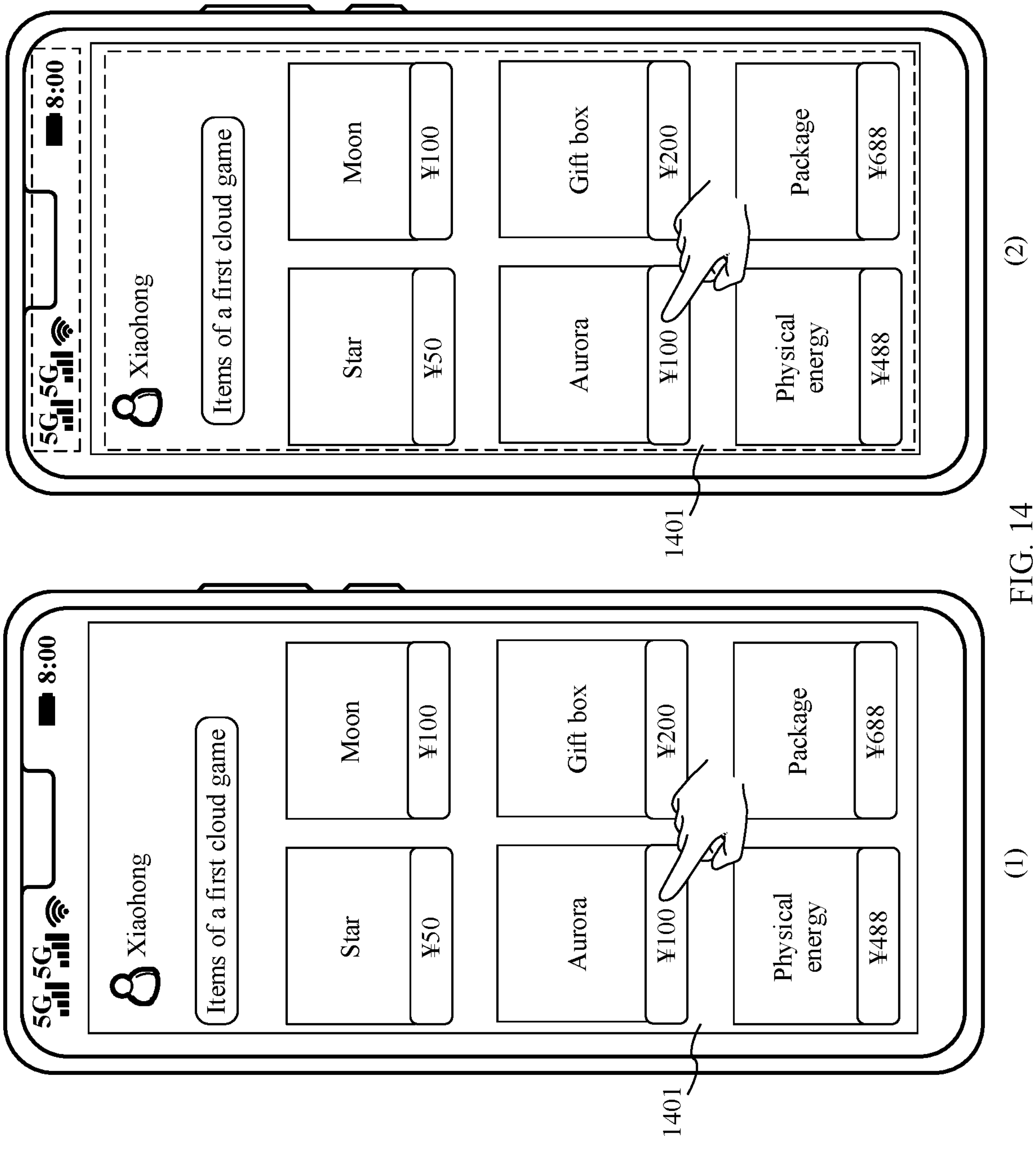
Figure 15:
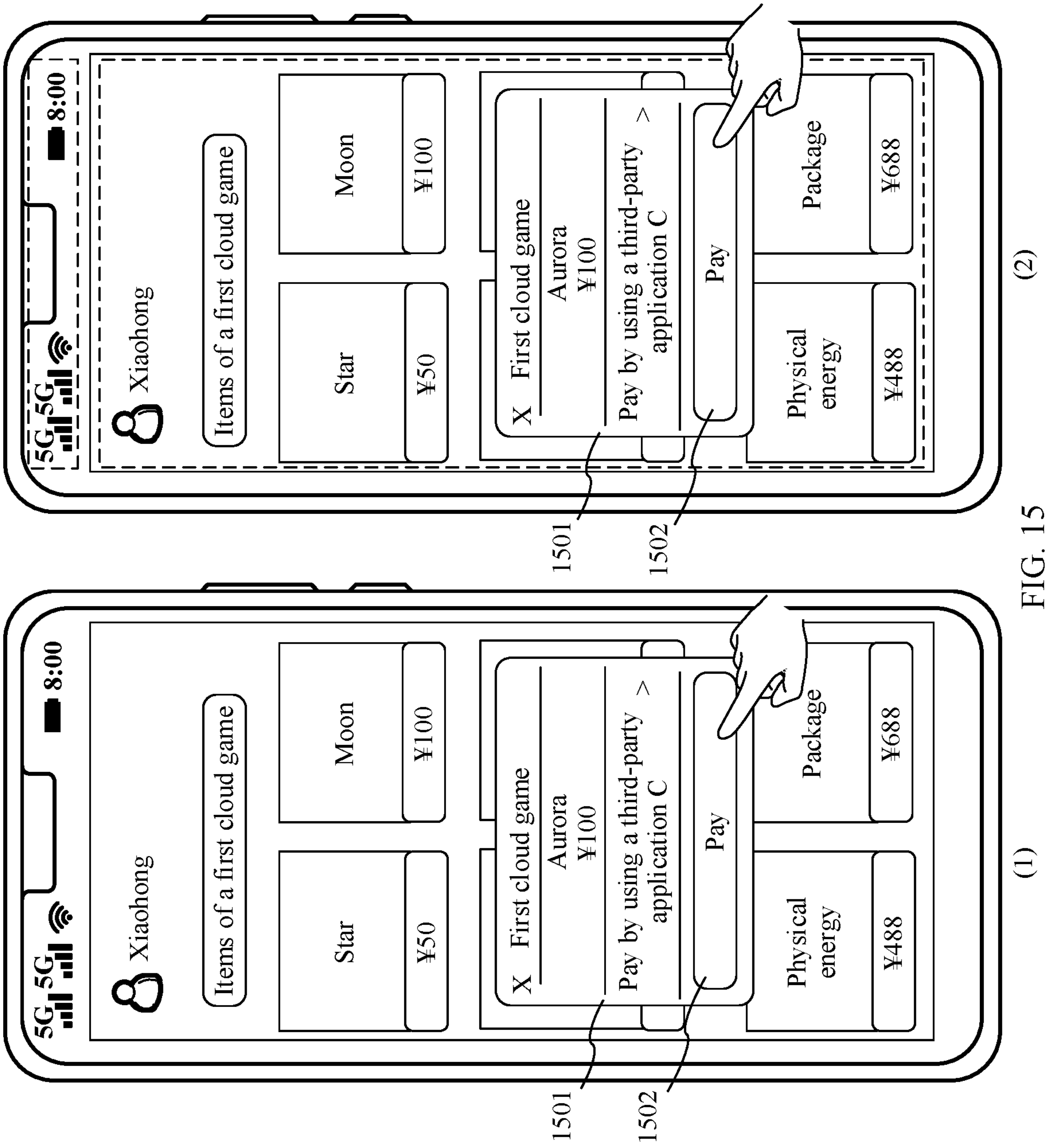
Figure 16:
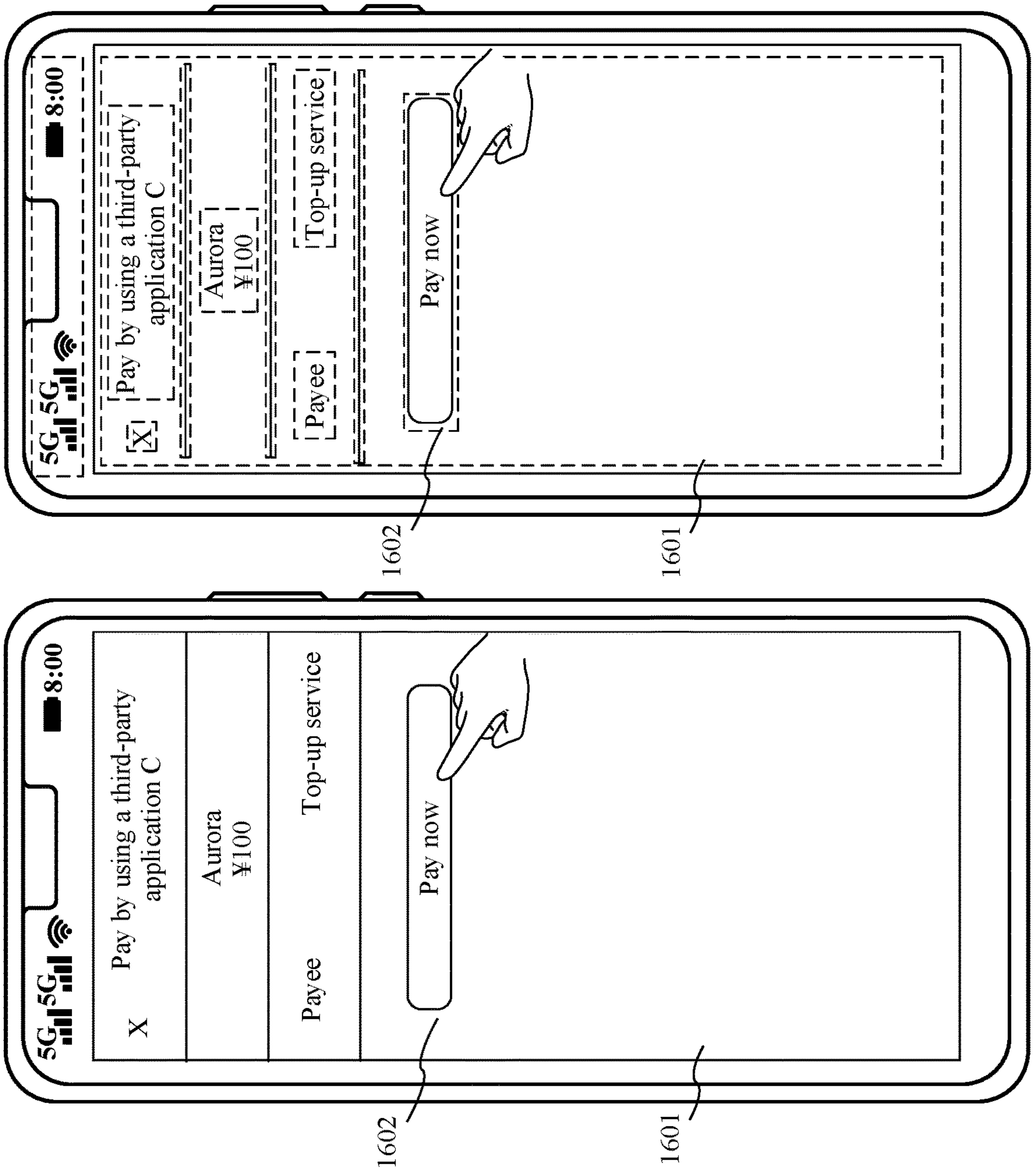
Figure 17:
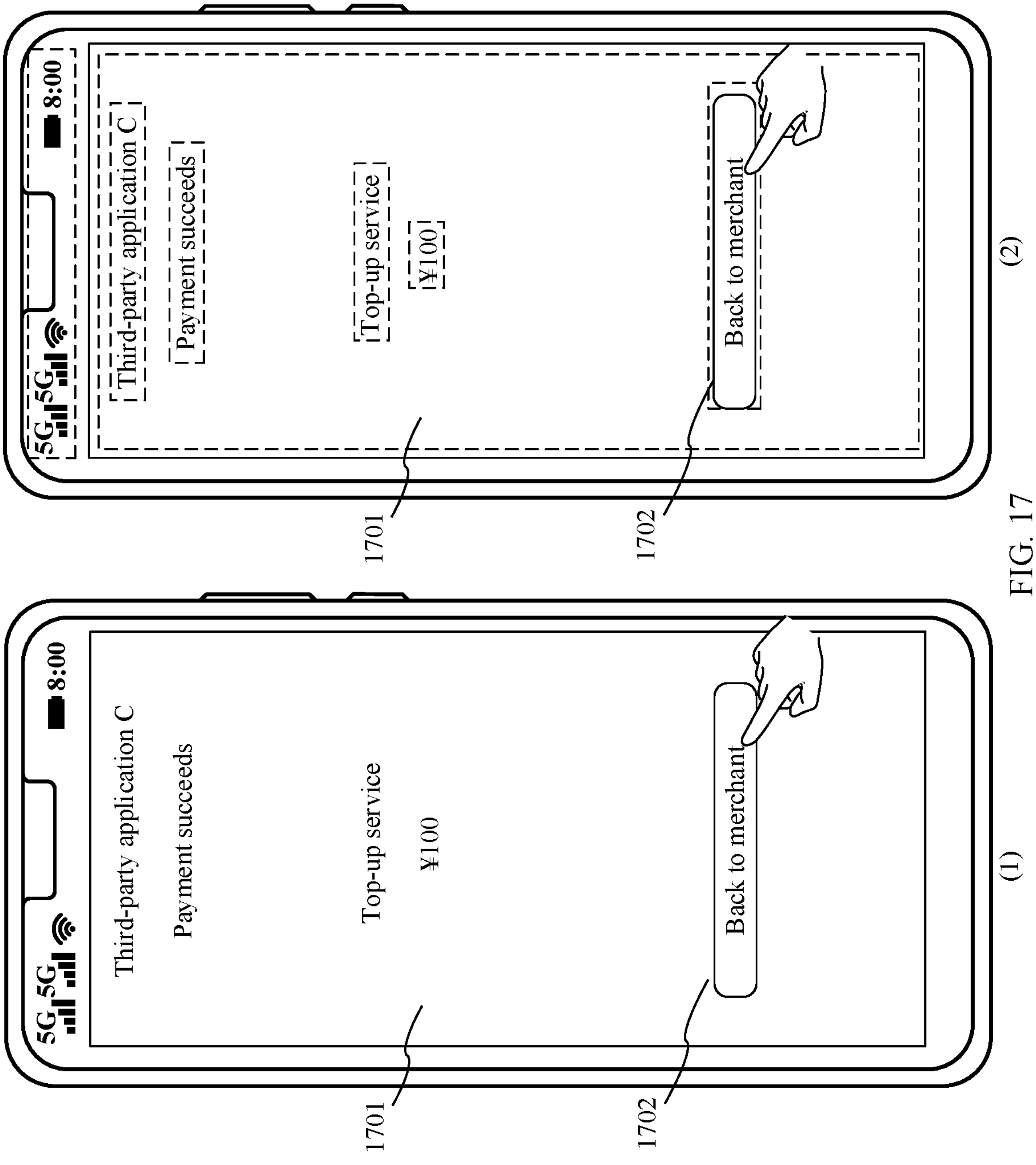
Figure 18:
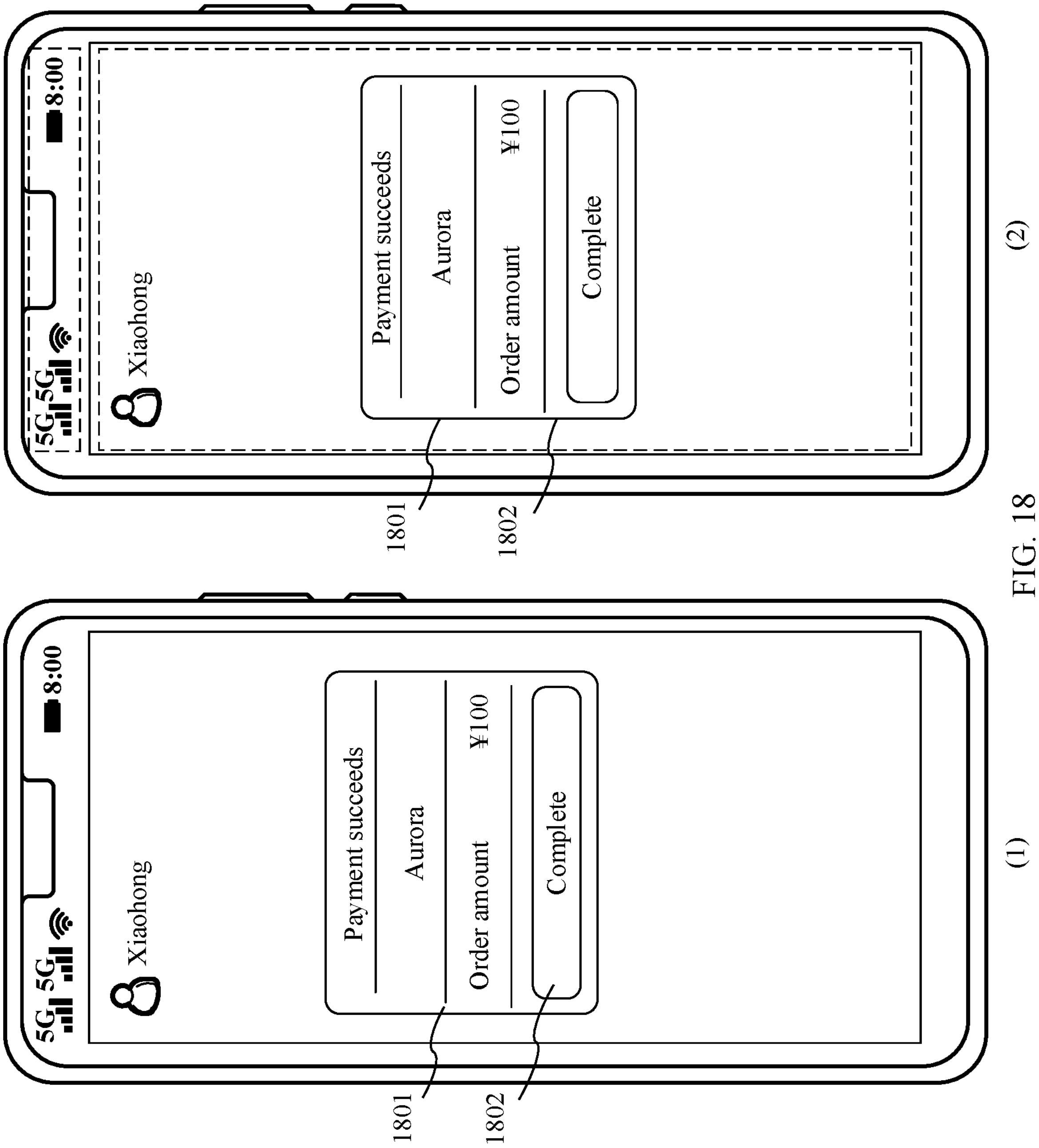
Figure 19:
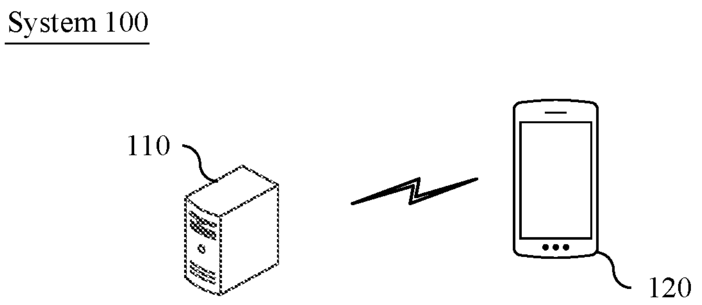
Figure 20:
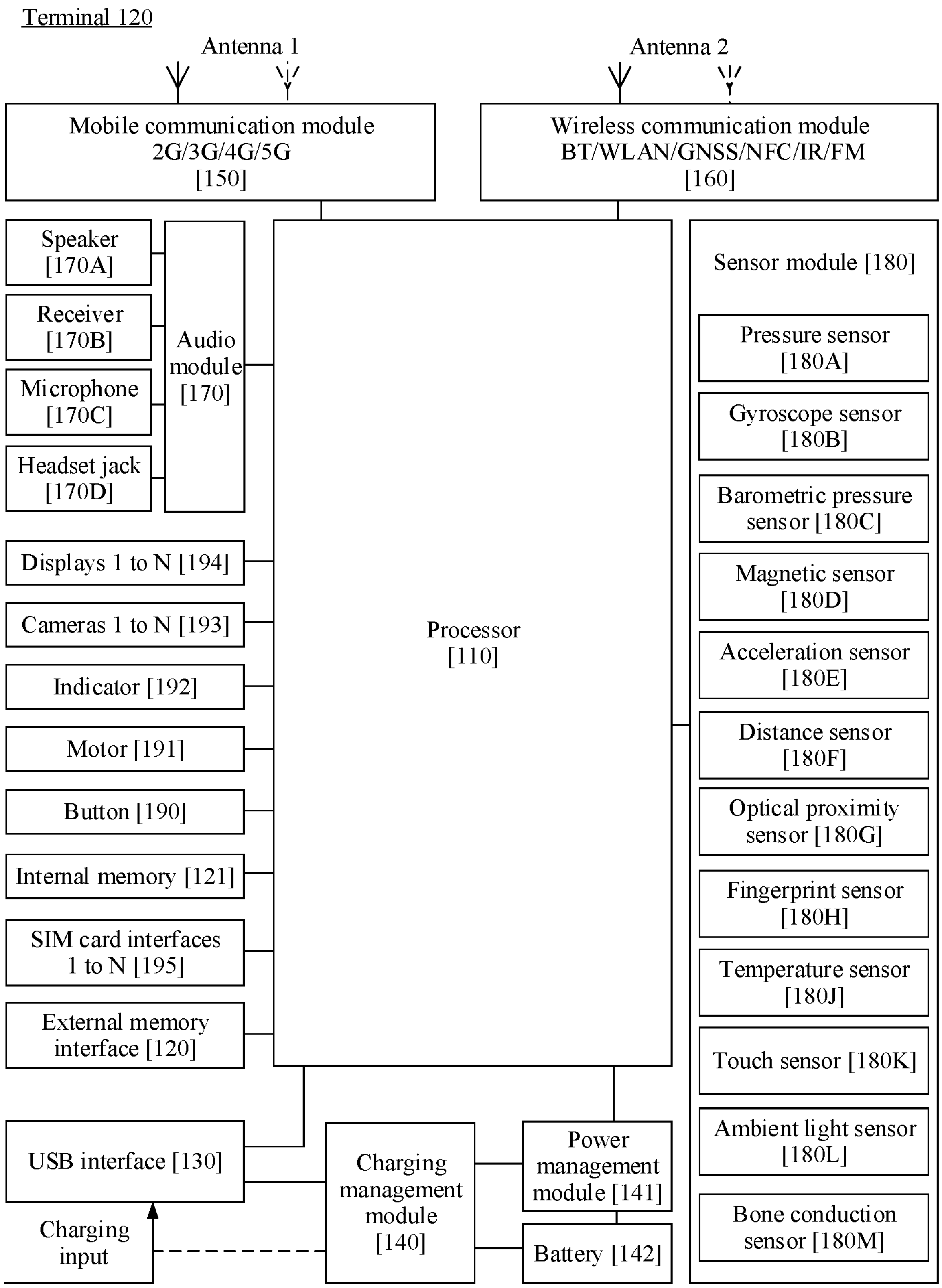

(1) in FIG. 5 is a schematic diagram of an application scenario of a service access method according to an embodiment of this application;

(2) in FIG. 5 is a schematic diagram of a display interface shown in (1) in FIG. 5 in a mode in which "Show layout bounds" in developer options is enabled;

FIG. 6 is a flowchart of a cloud game login method;

FIG. 7(A) is a schematic diagram of a display interface of another terminal;

FIG. 7(B) is a schematic diagram of the display interface shown in FIG. 7(1) in a mode in which "Show layout bounds" in developer options is enabled;

FIG. 8 is a schematic diagram of a display interface of another terminal in a mode in which "Show layout bounds" in developer options is enabled;

(1) in FIG. 9 is a schematic diagram of a display interface of still another terminal;

(2) in FIG. 9 is a schematic diagram of the display interface shown in (1) in FIG. 9 in a mode in which "Show layout bounds" in developer options is enabled;

FIG. 10 is a flowchart of another cloud game login method;

(1) in FIG. 11 is a schematic diagram of an application scenario of a service access method according to an embodiment of this application;

(2) in FIG. 11 is a schematic diagram of the display interface shown in (1) in FIG. 11 in a mode in which "Show layout bounds" in developer options is enabled;

FIG. 12(A) is a schematic diagram of an application scenario of a service access method according to an embodiment of this application;

FIG. 12(B) is a schematic diagram of the display interface shown in FIG. 12(1) in a mode in which "Show layout bounds" in developer options is enabled;

FIG. 13(A) is a part of a flowchart of applying a service access method to cloud game login according to an embodiment of this application;

FIG. 13(B) is diagram of another structure of a mobile phone/computer in FIG. 13(1);

(1) in FIG. 14 is a schematic diagram of an application scenario of another service access method according to an embodiment of this application;

(2) in FIG. 14 is a schematic diagram of a display interface shown in (1) in FIG. 14 in a mode in which "Show layout bounds" in developer options is enabled;

(1) in FIG. 15 is a schematic diagram of a display interface of still another terminal according to an embodiment of this application;

(2) in FIG. 15 is a schematic diagram of the display interface shown in (1) in FIG. 15 in a mode in which "Show layout bounds" in developer options is enabled;

(1) in FIG. 16 is a schematic diagram of a display interface of still another terminal according to an embodiment of this application;

(2) in FIG. 16 is a schematic diagram of the display interface shown in (1) in FIG. 16 in a mode in which "Show layout bounds" in developer options is enabled;

(1) in FIG. 17 is a schematic diagram of a display interface of still another terminal according to an embodiment of this application;

(2) in FIG. 17 is a schematic diagram of the display interface shown in (1) in FIG. 17 in a mode in which "Show layout bounds" in developer options is enabled;

(1) in FIG. 18 is a schematic diagram of a display interface of still another terminal according to an embodiment of this application;

(2) in FIG. 18 is a schematic diagram of the display interface shown in (1) in FIG. 18 in a mode in which "Show layout bounds" in developer options is enabled;

FIG. 19 is a schematic diagram of a structure of a system according to an embodiment of this application;

FIG. 20 is a schematic diagram of a structure of a terminal according to an embodiment of this application;

FIG. 21(1)A and FIG. 21(1)B are a first part of a flowchart of a service access method according to an embodiment of this application; and FIG. 21(2)A to FIG. 21(2)C are a second part of a flowchart of a service access method according to an embodiment of this application.

DETAILED DESCRIPTION OF THE EMBODIMENTS

The terms "first" and "second" mentioned below are merely intended for a purpose of description, and shall not be understood as an indication or implication of relative importance or implicit indication of a quantity of indicated technical features. Therefore, a feature limited by "first" or "second" may explicitly or implicitly include one or more features. In descriptions of embodiments, unless otherwise specified, "a plurality of" means two or more.

With development of cloud computing and full application of 5G networks, development of cloud services is promoted. The cloud services may include cloud game, cloud monitoring, cloud security, and the like. Cloud game is used as an example. Cloud games can be classified into a cloud mobile game, a cloud host game, and a cloud computer (personal computer, PC) game. The cloud mobile game may include a mobile game, a tablet game, a smart television game, and the like, and is usually run on an advanced reduced instruction set computing machine (advanced risc machine, ARM) architecture. The cloud host game (for example, a host game) and the cloud computer game (for example, a PC game) are usually run on an x86 architecture (X86 architecture). In embodiments of this application, an example in which cloud game is the cloud mobile game is used for description.

In a cloud game scenario, a user usually performs login to a cloud game in the following manners.

Figure 1:
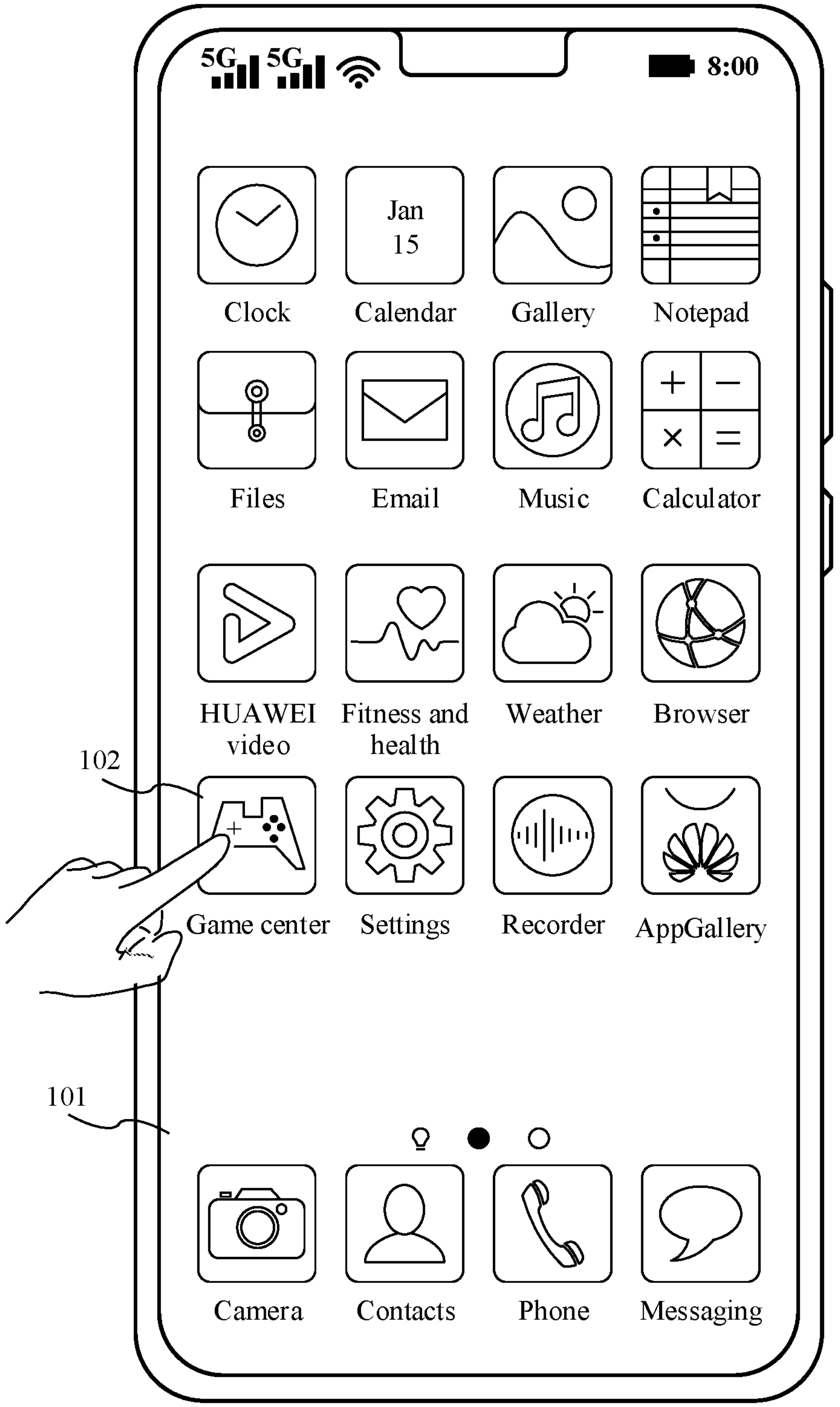
FIG. 1 is a schematic diagram of an application scenario of a service access method according to an embodiment of this application.

Manner 1: The user may perform login to the cloud game by operating a cloud game client on a terminal (namely, a mobile phone/computer). For example, FIG. 1 is a schematic diagram of an interface 101 of the terminal. When the user operates the cloud game client (namely, a game center application 102) on the interface 101 shown in FIG. 1, a display interface of the terminal may jump from the interface 101 shown in FIG. 1 to an interface 201 of the game center application 102 shown in FIG. 2. Images of a plurality of cloud game apps (such as a first cloud game, a second cloud game, a third cloud game, and a fourth cloud game) are displayed on the interface 201. The cloud game apps run on a cloud server (namely, a cloud game host, or referred to as a cloud phone/cloud computer).

FIG. 6 is a schematic flowchart of cloud game login. With reference to FIG. 6, ① when the user operates an icon of the first cloud game app in the plurality of cloud game apps on the interface 201 (for example, the user taps an "Instant play" control corresponding to the first cloud game app on the interface 201), the cloud game client sends a start request of the first cloud game app to the cloud game server. The start request carries an identifier and authorization information of the first cloud game app, and the authorization information may include a user name, a token (token), a nickname, a profile picture, a mailbox, a phone number, and the like. In this case, ② the cloud game server sends a start instruction to the first cloud game app based on the start request sent by the cloud game client. The first cloud game app displays an interface of the first cloud game app based on the start instruction. ③ The cloud game server sends interface information of the first cloud game app to the cloud game client. In this case, the terminal displays an interface 301 of the first cloud game app shown in FIG. 3(A), and displays, on the interface 301, that the first cloud game app is logged in to by using an account of the cloud game client (for example, an account of a game center application shown in FIG. 3(A)). A login information input box and a login control 302 are also displayed on the interface 301. ④ When the user enters an account and a password, that are shown in FIG. 4(A), to the login information input box, and operates the login control 302, the cloud game client sends an operation instruction to the cloud server. The cloud game server receives the operation instruction sent by the cloud game client, and simulates a user operation. ⑤ The cloud game server performs login to the first cloud game app based on the user operation. In this case, the display interface of the terminal may jump from the interface 301 shown in FIG. 4(A) to a game interface 501 shown in (1) in FIG. 5.

Figure 3A:
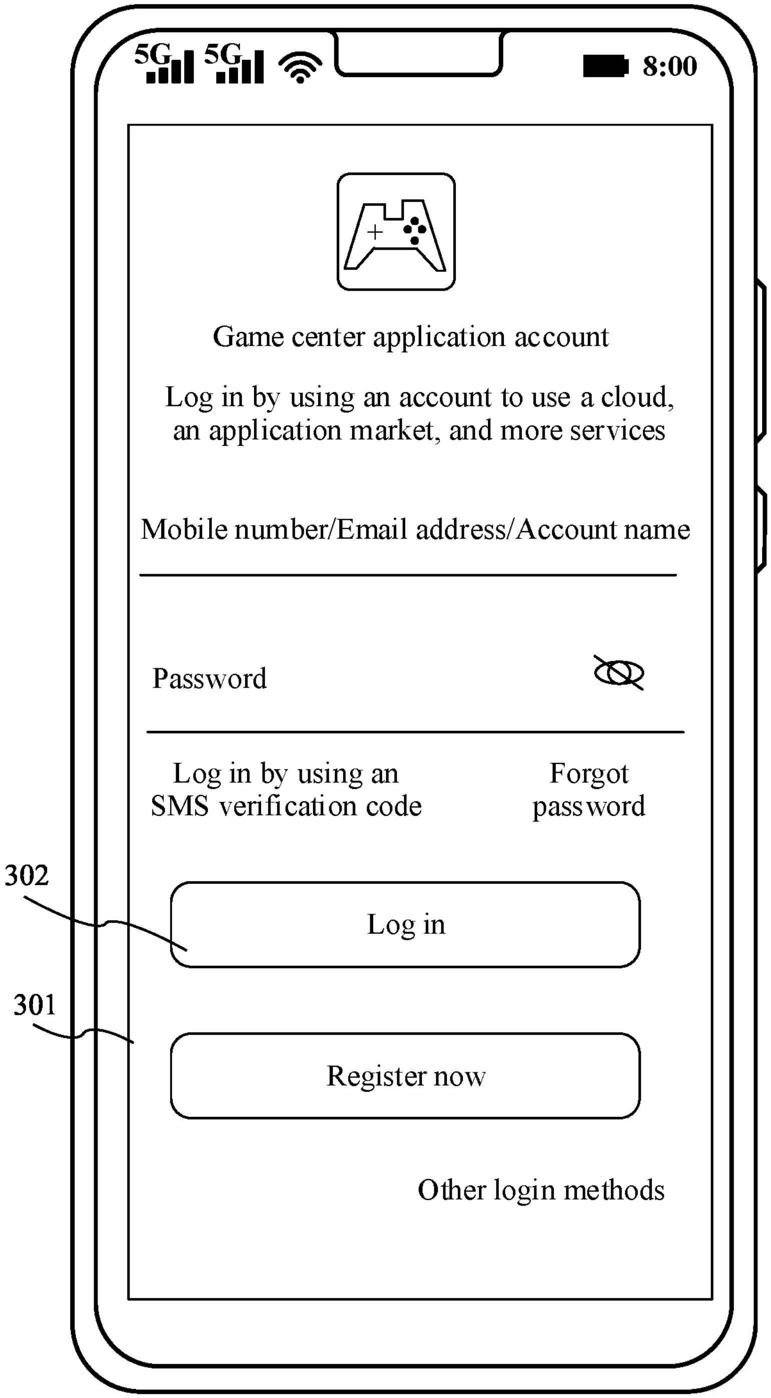
FIG. 3(A) is a schematic diagram of a display interface of a terminal.
Figure 3B:
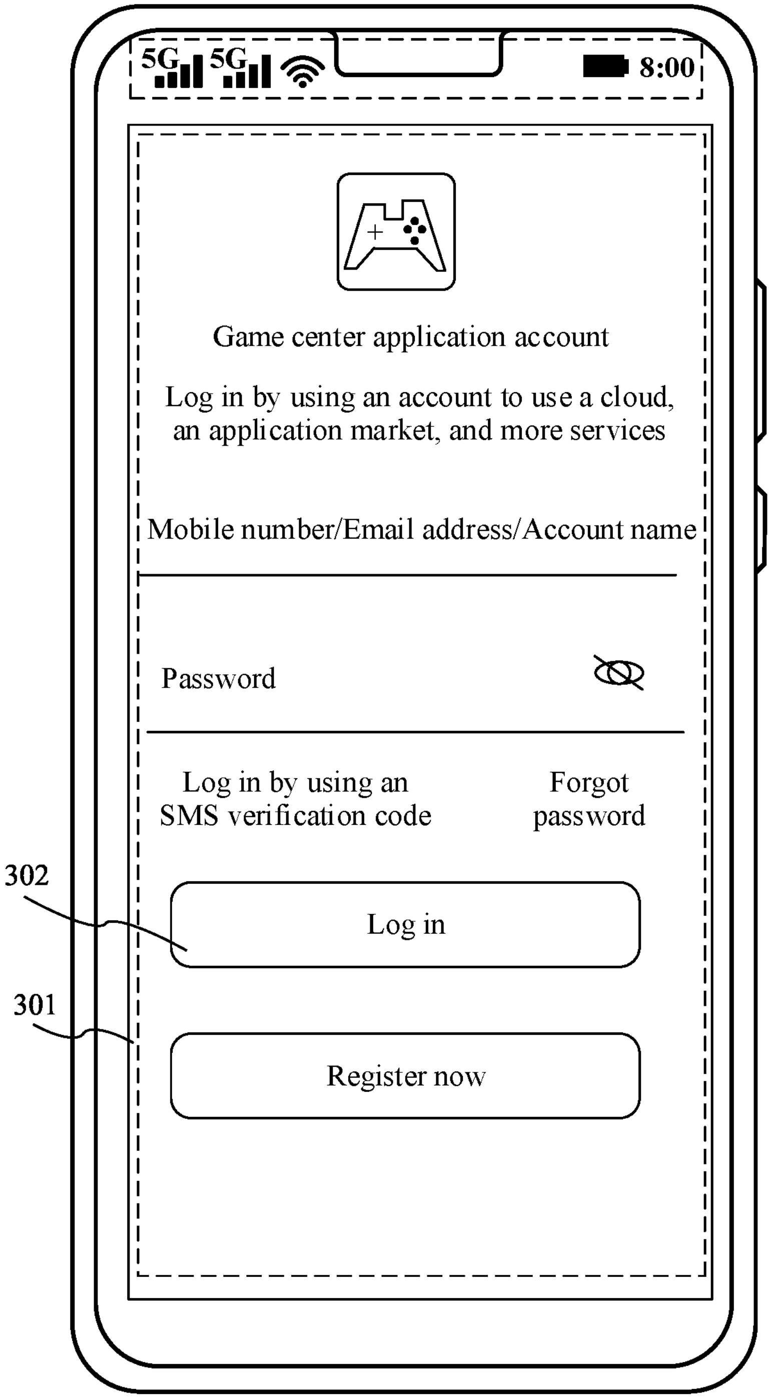
FIG. 3(B) is a schematic diagram of the display interface shown in FIG. 3(1) in a mode in which "Show layout bounds" in developer options is enabled.
Figure 4A:
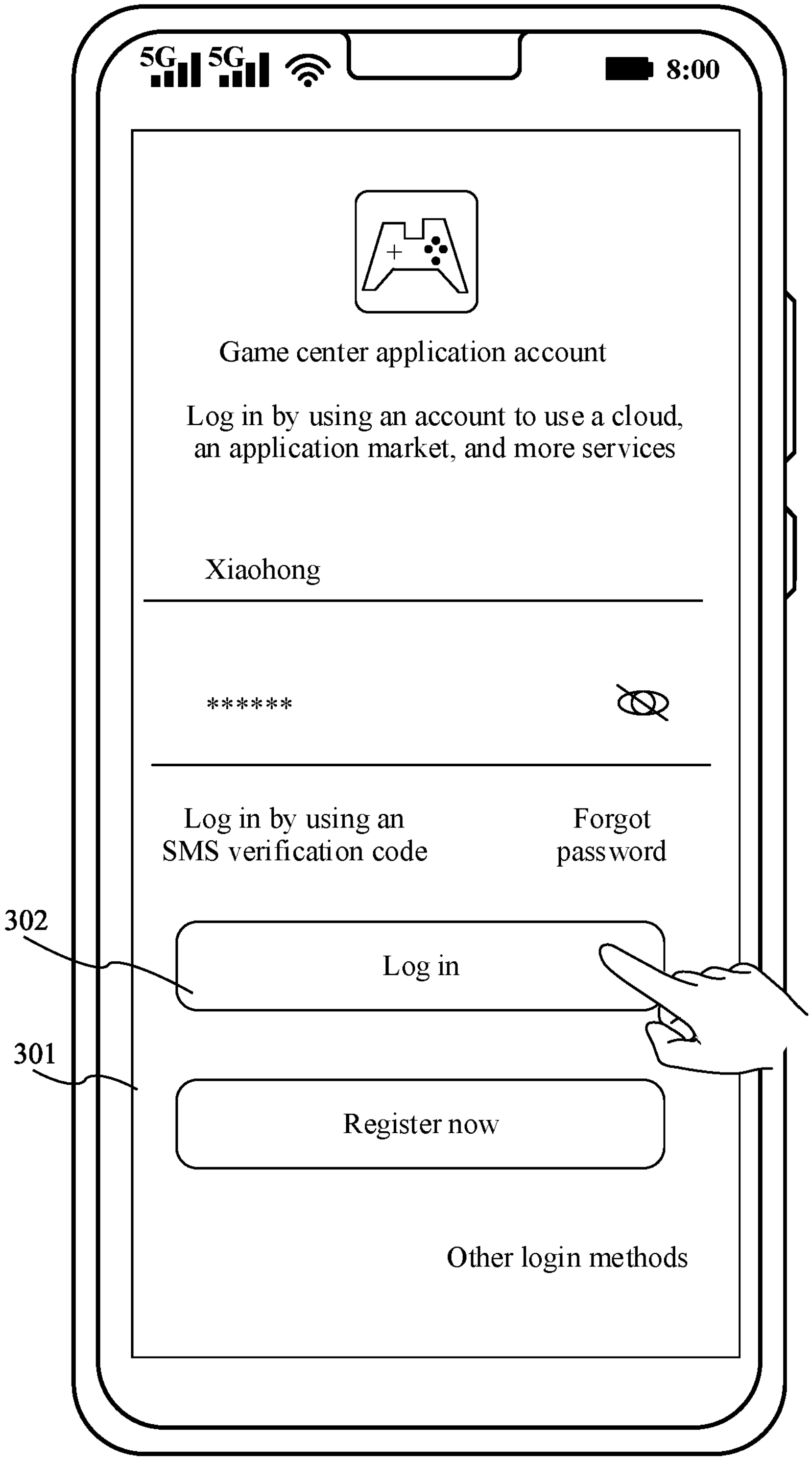
FIG. 4(A) is a schematic diagram of a display interface of a terminal.
Figure 4B:
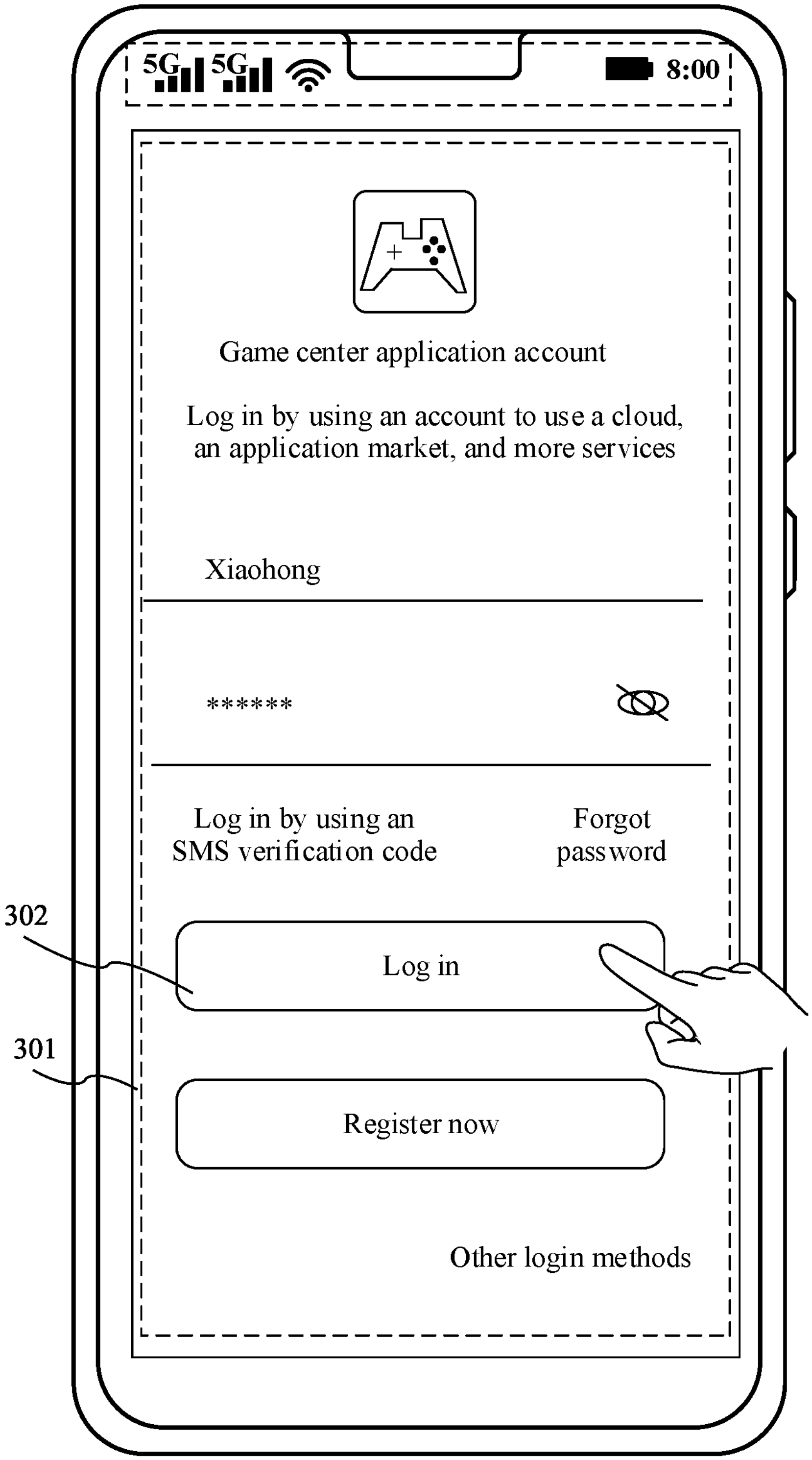
FIG. 4(B) is a schematic diagram of the display interface shown in FIG. 4(1) in a mode in which "Show layout bounds" in developer options is enabled.

For ease of distinguishing whether an interface belongs to the cloud server or the terminal, in a mode in which "Show layout bounds" in developer options is enabled, a layout bound box in FIG. 3(A) is a dashed-line box shown in FIG. 3(B). A in FIG. 4(A) is a dashed-line box shown in FIG. 4(B). A layout bound box in (1) in FIG. 5 is a dashed-line box shown in (2) in FIG. 5. It can be learned that all the interfaces shown in FIG. 3(A), FIG. 4(A), and (1) in FIG. 5 are of the cloud server.

To prevent the user from memorizing a plurality of accounts and passwords, a third-party account is used in most cloud game apps to log in to a game. Therefore, a method of logging in to the cloud game by using third-party login information emerges. Currently, there is a second cloud game login manner, which is as follows.

Manner 2: A difference between Manner 2 and Manner 1 lies in that FIG. 10 is a schematic flowchart of cloud game login. With reference to FIG. 10, after a first cloud game app receives a start instruction sent by a cloud game server, the first cloud game app starts the first cloud game app according to the start instruction, and displays an interface of the first cloud game app. ③ The cloud game server sends interface information of the first cloud game app to a cloud game client. The cloud game client displays the interface information of the first cloud game app. In this case, a display interface of a terminal may jump from an interface 201 shown in FIG. 2 to a login authorization interface 701 shown in FIG. 7(A). That the first cloud game app is logged in to by using an account of a third-party application is displayed on the login interface 701. A login information input box and a login control 702 are further displayed on the login interface 701. For ease of distinguishing whether an interface belongs to a cloud server or the terminal, in a mode in which "Show layout bounds" in developer options is enabled, a layout bound box in FIG. 7(A) is a dashed-line box shown in FIG. 7(B). It can be learned that the interface shown in FIG. 7(A) is of the cloud server. After a user enters login information to the login information input box, the terminal displays an interface shown in FIG. 8. FIG. 8 is a diagram of an interface in a mode in which "Show layout bounds" in the developer options is enabled. ④ When the user operates the login control 702 shown in FIG. 8, the cloud game client sends user operation information to the cloud game server. ⑤ The cloud game server receives the user operation information, and simulates a user operation based on the user operation information. The cloud game server sends an operation instruction to the first cloud game app in response to the user operation. ⑥ The first cloud game app invokes, based on the operation instruction, a third-party service SDK to send a login request to a third-party account service app. ⑩ The third-party account service app opens the login authorization interface based on the login request and waits for the user operation. The third-party account service app authorizes, based on the user operation, to log in to the first cloud game app by using a third-party account. The third-party account service app returns authorization information to the third-party account service SDK. The third-party account service SDK returns the authorization information to the first cloud game app. Login to the first cloud game app is performed. In this case, the display interface of the terminal may jump from the interface 701 shown in FIG. 8 to a start interface 901 of the first cloud game app shown in (1) in FIG. 9. An interface of the first cloud game and a game start control 902 are displayed on the start interface 901. For ease of distinguishing whether an interface belongs to the cloud server or the terminal, in a mode in which "Show layout bounds" in developer options is enabled, a layout bound box in (1) in FIG. 9 is a dashed-line box shown in (2) in FIG. 9. It can be learned that the interface shown in (1) in FIG. 9 is of the cloud server. ② When the user taps the game start control 902 on the start interface 301 displayed on the terminal, steps ⑦ and ⑧ are repeatedly performed, and the first cloud game app starts the game based on the operation instruction. In this case, the display interface of the terminal may jump from the interface 901 shown in FIG. 9 to a game interface 501 shown in (1) in FIG. 5.

In conclusion, the cloud game app runs on the cloud server. When the user needs to log in to the cloud game app, the user needs to enter account information to the cloud server to log in to the cloud game app. As a result, the user certainly doubts account security, and security and privacy risks are high. For example, when the terminal is disconnected from the cloud server on a network, there is a case in which a user account is still in a login state, and there is the security risk.

To resolve the foregoing technical problems, this application provides a service access method. The method includes: A terminal receives a first operation performed by a user on a first icon. The terminal displays a first interface in response to the first operation. The first interface is an interface of a first application corresponding to the first icon. The first interface includes a first control used to invoke a second application. The first application is an application running on a server. The terminal receives a second operation performed by the user on the first control. The second operation is responded to. The second operation indicates the first application to send a first request to the terminal. A first module of the terminal receives the first request through a first communication channel. The first communication channel is a communication channel between the first module and the server. The terminal invokes, based on the first request, the second application to implement a function corresponding to the first control. The second application is an application on the terminal. In this way, the first application on the server accesses the second application on a local terminal of the user. In addition, information like an account of the second application does not need to be uploaded to the server. This ensures information security.

The server may be understood as a cloud server.

In a specific implementation, for example, the second application is a third-party service application, and the first module is specifically a third-party service proxy SDK. The first communication channel is a communication channel between the third-party service proxy SDK and the server, and may be specifically a communication channel between the third-party service proxy SDK and a third-party service proxy app on the server. Therefore, this application provides a service access method, which may be specifically as follows: A terminal displays a second interface in response to receiving a first operation performed by the user on a first client on the first interface of the terminal. The second interface includes icons of a plurality of applications APPs. The terminal displays a third interface in response to receiving a second operation performed on an icon of a first app in the plurality of apps on the second interface. The third interface includes a first control used to invoke the third-party service app. Receiving a third operation performed by the user on the first control on the third interface is responded to. The third operation indicates the first app to send a first request to the terminal, specifically, indicates the first app running on a cloud server to send the first request to the third-party proxy service app by using a third-party service SDK embedded in the first app. The terminal receives, by using a third-party proxy service SDK embedded in the first client, the first request sent by the third-party proxy service app. The terminal invokes, based on the first request, the third-party service app to implement a function corresponding to the first control. In this way, an application APP on the cloud server accesses the third-party service application on a local terminal of the user, and account information of the third-party service application does not need to be uploaded to the cloud server. This ensures information security.

In an embodiment of this application, a service may include an account login authorization service, a real-name authentication service, an in-app payment service, an in-app advertisement service, a push service, and the like. Correspondingly, the first control separately includes a login authorization control, an authentication control, a payment control, an advertisement control, or a push control.

The following describes different scenarios, and an example in which the first application is a cloud game app is used for description. Details are as follows.

Scenario 1: Account Login Authorization Scenario

FIG. 13(A) is a schematic flowchart of applying the service access method to a cloud game login scenario according to an embodiment of this application. With reference to FIG. 13(A), ① when the user operates the first cloud game application APP shown in FIG. 2, a cloud game client on a cloud game terminal requests the first cloud game app on the cloud server to establish the communication channel. The communication channel may be understood as a communication channel between the third-party proxy service SDK that is embedded in the cloud game client and that is on the terminal and the third-party proxy service app on the cloud server.

Figure 2:
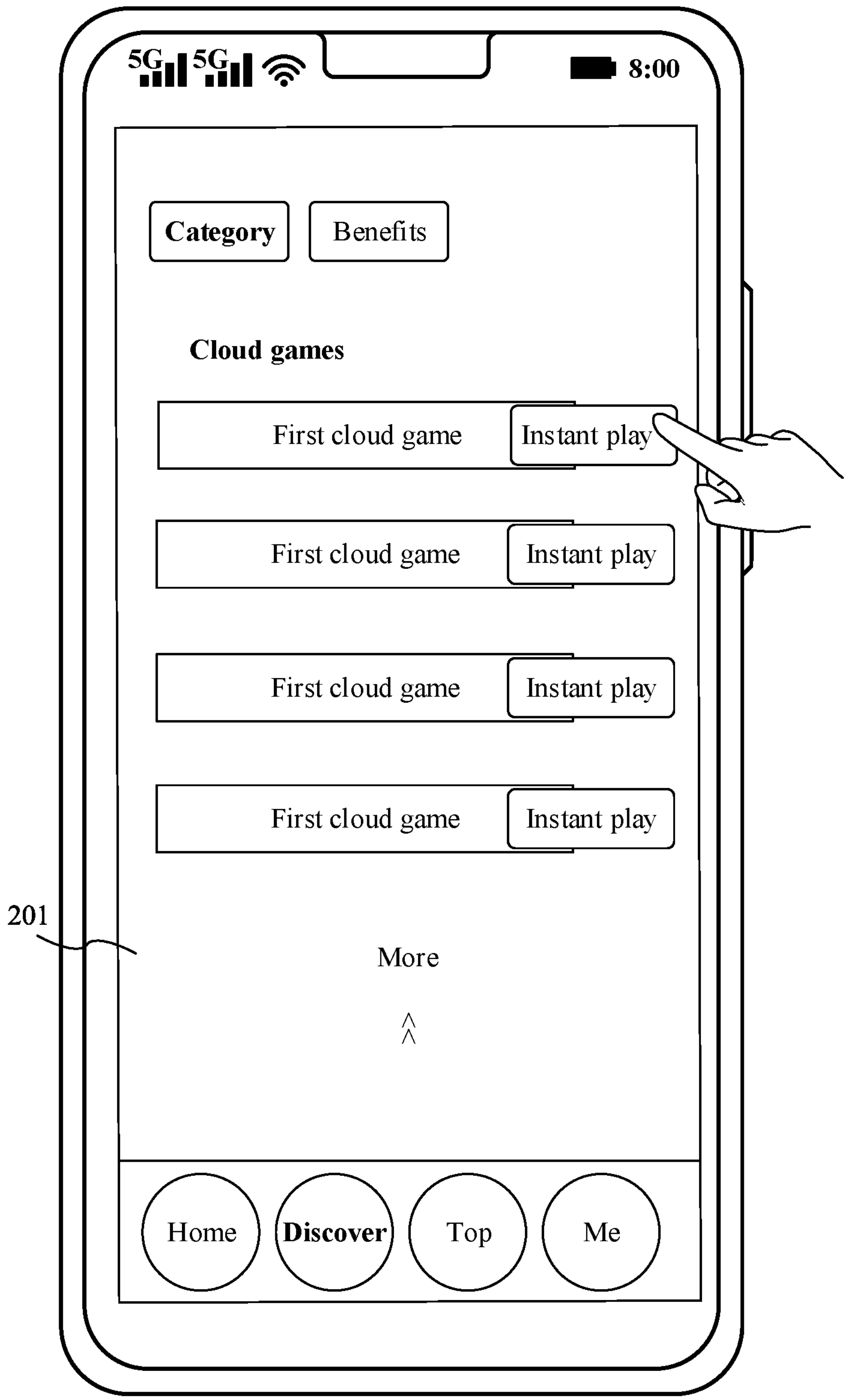
FIG. 2 is a schematic diagram of an application scenario of a service access method according to an embodiment of this application.

Specifically, when the user operates a first cloud game app shown in FIG. 2, the cloud game client obtains information about the first cloud game app and information about the third-party proxy service app on the cloud server. The information may include an IP address, a port, and the like. The cloud game client may obtain the information about the first cloud game app and the information about the third-party proxy service app from another server. The another server may be a resource scheduling server. The cloud game client starts the third-party service proxy SDK, and imports the obtained information about the first cloud game app and the obtained information about the third-party proxy service app into the third-party service proxy SDK. In this case, the communication channel between the third-party service proxy SDK and the third-party proxy app is established. It should be noted herein that, after the third-party proxy service app is installed on the cloud server, a port of the third-party proxy service app can be invoked. In other words, the third-party proxy service app may be in a started state on the cloud server.

In this case, the cloud game client sends a request to the cloud game server to start an app.

② The cloud game server receives the request that is sent by the cloud game client and that is for requesting to start the app. The cloud game server sends a start instruction to the first cloud game app based on the request. The first cloud game app starts the first cloud game app according to the start instruction, and displays an interface of the first cloud game app. ③ The cloud game server sends information about the interface to the cloud game client. In this case, the terminal displays an interface 1101 shown in (1) in FIG. 11. The interface of the first cloud game app is displayed on the interface 1101. In addition, a first control (for example, a login authorization control of a third-party application A and a login authorization control of a third-party application B) used to invoke the third-party service application (namely, the third-party service app) is further displayed on an interface 1201. The first control is a login authorization control. It should be noted herein that the third-party service application and the first cloud game application may be developed by different vendors. Therefore, the first cloud game app cannot directly invoke the third-party service application. The third-party service application needs to be invoked through the communication channel in an embodiment of this application. For ease of distinguishing whether an interface belongs to the cloud server or the terminal, in a mode in which “Show layout bounds” in developer options is enabled, a layout bound box in (1) in FIG. 11 is a dashed-line box shown in (2) in FIG. 11. It can be learned that the interface shown in (1) in FIG. 11 is of the cloud server.

④ When the user operates the first control, the terminal sends operation information to the cloud server. The cloud server simulates a user operation based on the operation information, and generates an operation instruction. ⑤ The cloud server sends the operation instruction to the first cloud game app. The first cloud game app invokes, based on the operation instruction, a third-party service SDK, that is embedded in the first cloud game app, to send an invocation request (namely, the first request) to the third-party proxy service app. The invocation request is used to invoke the third-party service app, and request the third-party service app to authorize to log in to the first cloud game app by using a third-party service account. ⑥ The third-party service SDK sends the invoking request to the third-party proxy service app. ⑦ The third-party proxy service app sends the invoking request to the third-party proxy service SDK. ⑧ The third-party proxy service SDK invokes the third-party service app. In this case, the terminal displays a login authorization interface 1201 shown in FIG. 12(A). Application information of an official application of the first cloud game, third-party account information, and an authorization control (a control 1202 shown in FIG. 12(A)) are also displayed on the interface 1201. For ease of distinguishing whether an interface belongs to the cloud server or the terminal, in a mode in which "Show layout bounds" in the developer options is enabled, a layout bound box in FIG. 12(A) is a dashed-line box shown in FIG. 12(B). It can be learned that the interface shown in FIG. 12(A) is of the terminal. ⑨ When the user operates the control 1202, the third-party service app feeds back a response result to the third-party proxy service SDK. The response result may include login authorization. ⑩ The third-party proxy service SDK feeds back the response result to the third-party proxy service app. ⑪ The third-party proxy service app feeds back the response result to the third-party service SDK, and the third-party service SDK feeds back the response result to the first cloud game app. The first cloud game app processes the response result, performs a login operation, and sends, to the cloud game client by using the cloud game server, interface information obtained after login. In this case, the interface of the terminal may jump from the interface 1201 shown in FIG. 12(A) to the game interface 501 shown in (1) in FIG. 5.

Certainly, the third-party proxy service SDK is not limited to being embedded in the cloud game client. The third-party proxy service SDK may be configured in a terminal system. For example, as shown in FIG. 13(B), both the cloud game client and the third-party service app are set at an application layer of the terminal. The third-party proxy service SDK is set in a system service of the terminal. In a structure shown in FIG. 13(B), a method procedure in FIG. 13(A) may still be used.

It can be learned that an application on the cloud server can invoke an application on the local terminal of the user through the communication channel in this embodiment of this application, and the two applications can be applications developed by different vendors. Specifically, the first cloud game app on the cloud server may access the third-party service app on the local terminal of the user, and account information of the third-party service app does not need to be uploaded to the cloud server. This ensures information security.

In addition, before login to the first cloud game app, the terminal displays a game interface of the first cloud game app. In this way, the user can intuitively learn content of the first cloud game app before login to the first cloud game app, instead of first performing login to the first cloud game app and then starting the first cloud game app to learn the content of the first cloud game app. This embodiment of this application better complies with a game login procedure.

In addition, in this embodiment of this application, a cloud game operator does not need to apply to a third-party account service provider for permission of proxy game authorization and login. The cloud game login method provided in this embodiment of this application is compatible with various cloud games, and is universal.

In addition, in this embodiment of this application, a game vendor does not need to re-integrate a new third-party account SDK for a game. In other words, an existing cloud game does not need to be modified. This reduces development expenditures and costs.

Scenario 2: In-App Payment Service Scenario

A specific principle in this scenario is the same as that in Scenario 1. Details are not described herein again. After the foregoing operations are performed, interface changes are as follows.

When the user operates a first control (for example, a "¥100" control corresponding to an "Aurora" image) on an interface 1401 shown in (1) in FIG. 14 of the first cloud game app, the first cloud game app requests a third-party account service app for payment. In this case, the display interface of the terminal may jump from the interface 1401 shown in (1) in FIG. 14 to a payment interface 1501 shown in (1) in FIG. 15. Payment information and a third-party payment control 1502 are displayed on the payment interface 1501. When the user operates the third-party payment control 1502 shown in (1) in FIG. 15, the display interface of the terminal may jump from the interface 1501 shown in (1) in FIG. 15 to a payment interface 1601 of the third-party service app shown in (1) in FIG. 16. Payment information, a payment control, and the like are displayed on the payment interface 1601. When the user taps the payment control on the payment interface 1601 shown in (1) in FIG. 16, the display interface of the terminal may jump from the interface 1601 shown in (1) in FIG. 16 to an interface 1701 of the third-party service app shown in (1) in FIG. 17. Payment success information, a "Back to merchant" control, and the like are displayed on the interface 1701. When the user taps the "Back to merchant" control on the payment interface 1701 shown in (1) in FIG. 17, the display interface of the terminal may jump from the interface 1701 shown in (1) in FIG. 17 to an interface 1801 of the first cloud game app shown in (1) in FIG. 18. Payment success information, a "Complete" control, and the like are displayed on the interface 1801. When the user taps the "Complete" control on the interface 1801 shown in (1) in FIG. 18, the display interface of the terminal may jump from the interface 1801 shown in (1) in FIG. 18 to the game interface 501 shown in FIG. 5.

It should be noted herein that, for ease of distinguishing whether an interface belongs to the cloud server or the terminal, in a mode in which "Show layout bounds" in developer options is enabled, a layout bound box in (1) in FIG. 14 is a dashed-line box shown in (2) in FIG. 14. A layout bound box in (1) in FIG. 15 is a dashed-line box shown in (2) in FIG. 15. A layout bound box in (1) in FIG. 16 is a dashed-line box shown in (2) in FIG. 16. A layout bound box in (1) in FIG. 17 is a dashed-line box shown in (2) in FIG. 17. A layout bound box in (1) in FIG. 18 is a dashed-line box shown in (2) in FIG. 18. It can be learned that the interfaces shown in (1) in FIG. 14, (1) in FIG. 15, and (1) in FIG. 18 are of the cloud server, and the interfaces shown in (1) in FIG. 16 and (1) in FIG. 17 are of the terminal.

Therefore, in this embodiment of this application, the third-party service app on the terminal completes payment, but the cloud server does not invoke the third-party service app on a cloud to perform payment. In this way, the application APP on the cloud server accesses the third-party service app on the local terminal of the user.

Certainly, the service access method provided in embodiments of this application is not limited to the foregoing scenarios. There may be another scenario, for example, a real-name authentication scenario. A principle and an effect of the real-name authentication scenario are both the same as those in the foregoing payment scenario and the foregoing login authorization scenario. Details are not described herein again.

The following describes the service access method provided in embodiments of this application with reference to the accompanying drawings in embodiments of this application.

The service access method provided in embodiments of this application may be applied to a system including a terminal and a cloud server shown in FIG. 19. As shown in FIG. 19, the system 100 may include a cloud server 110 and a terminal 120.

The cloud server 110 may include a cloudified service resource server, a cloud virtual device, an application APP, a cloud server, a third-party service SDK, and a third-party proxy service app. The cloudified service resource server is a physical server in cloud computing, and is used to provide a computing resource directly used for a service, namely, a cloud virtual device. The cloud virtual device is a virtual device and system that is created on the cloud server based on a related cloud computing technology and that are used to run terminal application software, for example, a cloud phone running an Android system. The app is terminal application software, for example, a game client or an office software client. The third-party service SDK is a secondary development software package provided by a third-party service provider, and is responsible for accessing a third-party service on a device on which the third-party service SDK is located. In this embodiment, the third-party service SDK is responsible for accessing a third-party proxy service on the virtual device. The third-party proxy service app is specific service software provided by the third-party service provider, has a same external identifier (for example, a package name, a signature, and a service name) and a same development interface as those of an existing third-party service app, and is used by a cloudified service operator to deploy the third-party proxy service on the cloud virtual device to replace the existing third-party service app. The cloud server is a set of server software deployed by the cloudified service operator on the cloud virtual device. Main functions of the cloud server include controlling start and stop of the terminal application software on the cloud virtual device, implementing audio and video capture, encoding, and forwarding, and restoring a user operation, that is reported by a cloudified service client on the cloud virtual device, to implement control of the terminal application software, for example, a cloud game service in a cloud game scenario. Serialization (Serialization) is a process of converting status information of an object into a form that can be stored or transmitted, for example, a process of encrypting information. Deserialization is a reverse process of serialization, for example, a process of decrypting information.

In this embodiment of this application, main capabilities of the third-party proxy service app are starting a listening port of a secure communication channel, receiving an access request of the third-party service SDK for the third-party service app, serializing the access request, forwarding a serialized access request, receiving a serialized response result of the third-party service app, deserializing a response result of the third-party service app, and returning the response result to the third-party service SDK. In addition, the third-party proxy service app does not have a capability of processing a third-party service request, and does not store a processing result returned by the third-party service app.

It should be noted herein that, if the third-party service provider and the cloudified service operator are a same company, and an app mainly operated by the cloudified service operator is a self-owned service of the company, when opening a proxy capability to another company is not considered, a code of the third-party service proxy service may be directly added to the app or a third-party service SDK used by the app, and the third-party agent service app does not need to be opened.

The terminal 120 is configured to install and run various types of service application software. For example, the terminal 120 includes the cloudified service client, the third-party service app, and the third-party proxy service SDK. The third-party service app is an application software service that provides one or more specific service interface access capabilities, for example, an account login authorization service, a real-name authentication service, an in-app payment service, an in-app advertisement service, and a push service. The third-party proxy service SDK is a specific secondary development software package provided by the third-party service provider, has a capability of accessing the third-party service app as a proxy of another application, and is responsible for accessing the third-party service app on a local device of a user. The cloudified service client is a specific terminal application software provided by the cloudified service operator for the user, and may access, by using the application, one or more pieces of terminal application software, such as a cloud game client and a cloud office client, deployed by the cloudified service operator on the cloud virtual device can be accessed.

In this embodiment of this application, the third-party service proxy SDK is integrated by the cloudified service operator in the cloudified service client of the cloudified service operator. The user downloads the service cloudified client and installs the service cloudified client on the local device of the user. Main capabilities of the third-party service proxy SDK are establishing the secure communication channel with the third-party proxy service app, receiving a serialized request, deserializing the request, invoking the third-party service app, receiving the response result returned by the third-party service app, serializing the response result of the third-party service app, and forwarding a serialized response result of third-party service apps. In addition, the third-party service proxy SDK does not have a capability of processing a third-party service request, and does not store a processing result returned by the third-party service app.

It should be noted herein that, if the third-party service provider and the cloudified service operator are the same company, and when opening the proxy capability to the another company is not considered, a code of the third-party service proxy SDK may be directly added to the service cloudified client, and the third-party service proxy SDK does not need to be opened to the outside.

The terminal 120 may be a device having a display function, for example, a mobile phone, a tablet computer, a desktop computer, a laptop computer, a notebook computer, an ultra-mobile personal computer (Ultra-mobile Personal Computer, UMPC), a handheld computer, a smart television, a netbook, or a virtual reality device. A specific form of the terminal is not specially limited in embodiments of this application.

FIG. 20 is a block diagram of a structure of the terminal 120.

As shown in FIG. 20, the terminal 120 may include a processor 110, an external memory interface 120, an internal memory 121, a universal serial bus (universal serial bus, USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (subscriber identity module, SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It can be understood that the structure illustrated in this embodiment of the present invention does not constitute a specific limitation on the terminal 120. In some other embodiments of this application, the terminal 120 may include more or fewer components than those shown in the figure, or some components may be combined, or some components may be split, or there may be a different component layout. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a video codec, a digital signal processor (digital signal processor, DSP), a baseband processor, a neural-network processing unit (neural-network processing unit, NPU), and/or the like. Different processing units may be independent components, or may be integrated into one or more processors.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor may directly invoke the instructions or the data from the memory. This avoids repeated access, and reduces a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

The I2C interface is a two-way synchronization serial bus, and includes a serial data line (serial data line, SDA) and a serial clock line (derail clock line, SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal 120.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may further be configured to: perform audio communication, and sample, quantize, and code an analog signal. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement the function of answering a call through a Bluetooth headset. Both the I2S interface and the PCM interface may be configured to perform audio communication.

It may be understood that an interface connection relationship between the modules illustrated in this embodiment of the present invention is merely a schematic illustration, and does not constitute a limitation on the structure of the terminal 120. In some other embodiments of this application, the terminal 120 may alternatively use an interface connection manner different from that in the foregoing embodiment, or a combination of a plurality of interface connection manners.

The charging management module 140 is configured to receive a charging input from a charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input through a wireless charging coil of the terminal 120. When charging the battery 142, the charging management module 140 may further supply power to the electronic device by using the power management module 141.

The power management module 141 is configured to connect to the battery 142, the charging management module 140, and the processor 110. The power management module 141 receives an input from the battery 142 and/or an input from the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same component.

A wireless communication function of the terminal 120 may be implemented by using the antenna 1, the antenna 2, the mobile communication module 150, the wireless communication module 160, the modem processor, the baseband processor, and the like.

The antenna 1 and the antenna 2 are configured to transmit and receive electromagnetic wave signals. Each antenna in the terminal 120 may be configured to cover one or more communication frequency bands. Different antennas may be further multiplexed to improve antenna utilization. For example, the antenna 1 may be multiplexed as a diversity antenna of a wireless local area network. In some other embodiments, the antenna may be used in combination with a tuning switch.

The mobile communication module 150 may provide a wireless communication solution that includes 2G/3G/4G/5G and that is applied to the terminal 120. The mobile communication module 150 may include at least one filter, a switch, a power amplifier, a low noise amplifier (low noise amplifier, LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least some functional modules of the mobile communication module 150 may be disposed in the processor 110. In some embodiments, at least some functional modules of the mobile communication module 150 and at least some modules of the processor no may be disposed in a same component.

The wireless communication module 160 may provide a wireless communication solution that is applied to the terminal 120 and that includes a wireless local area network (wireless local area network, WLAN) (for example, a wireless fidelity (wireless fidelity, Wi-Fi) network), Bluetooth (Bluetooth, BT), a global navigation satellite system (global navigation satellite system, GNSS), frequency modulation (frequency modulation, FM), a near field communication (near field communication, NFC) technology, an infrared (infrared, IR) technology, and the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-transmitted signal from the processor 110, perform frequency modulation and amplification on the signal, and convert a processed signal into an electromagnetic wave for radiation through the antenna 2.

In some embodiments, the antenna 1 of the terminal 120 is coupled to the mobile communication module 150, and the antenna 2 is coupled to the wireless communication module 160, so that the terminal 120 can communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (BeiDou navigation satellite system, BDS), a quasi-zenith satellite system (quasi-zenith satellite system, QZSS), and/or a satellite based augmentation system (satellite based augmentation systems, SBAS).

The terminal 120 implements a display function by using the GPU, the display 194, the application processor, and the like. The GPU is a microprocessor for image processing, and is connected to the display 194 and the application processor. The GPU is configured to: perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light-emitting diode (active-matrix organic light-emitting diode, AMOLED), a flexible light-emitting diode (flexible light-emitting diode, FLED), a mini-LED, a micro-LED, a micro-OLED, a quantum dot light-emitting diode (quantum dot light-emitting diode, QLED), or the like. In some embodiments, the terminal 120 may include one or N displays 194, where N is a positive integer greater than 1.

The terminal 120 may implement a photographing function by using the ISP, the camera 193, the video codec, the GPU, the display 194, the application processor, and the like.

The camera 193 is configured to capture a static image or a video. An optical image of an object is generated through a lens, and is projected onto a photosensitive element. The photosensitive element may be a charge-coupled device (charge-coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format, for example, RGB or YUV. In some embodiments, the terminal 120 may include one or N cameras 193, where N is a positive integer greater than 1.

The digital signal processor is configured to process a digital signal, and may process another digital signal in addition to the digital image signal. For example, when the terminal 120 selects a frequency, the digital signal processor is configured to perform Fourier transformation on frequency energy.

The video codec is configured to compress or decompress a digital video. The terminal 120 may support one or more video codecs. In this way, the terminal 120 can play or record videos in a plurality of encoding formats, for example, moving picture experts group (moving picture experts group, MPEG)-1, MPEG-2, MPEG-3, and MPEG-4.

The external memory interface 120 may be configured to connect an external memory card, for example, a Micro SD card, to expand a storage capability of the terminal 120. The external memory card communicates with the processor 110 through the external memory interface 120, to implement a data storage function. For example, files such as music and videos are stored in the external storage card.

The internal memory 121 may be configured to store computer-executable program code. The executable program code includes instructions. The internal memory 121 may include a program storage region and a data storage region. The program storage region may store an operating system, an application required by at least one function (for example, a voice playing function or an image playing function), and the like. The data storage region may store data (for example, audio data or a phone book) created during use of the terminal 120.

The terminal 120 may implement an audio function by using the audio module 170, the speaker 170A, the receiver 170B, the microphone 170C, the headset jack 170D, the application processor, and the like, for example, music playing and sound recording.

The audio module 170 is configured to convert digital audio information into an analog audio signal for output, and is also configured to convert an analog audio input into a digital audio signal. The audio module 170 may be further configured to code and decode an audio signal.

The speaker 170A, also referred to as a "loudspeaker", is configured to convert an electrical audio signal into a sound signal. The terminal 120 may be for listening to music or answering a call in a hands-free mode over the speaker 170A.

The receiver 170B, also referred to as an "earpiece", is configured to convert an electrical audio signal into a sound signal. When a call is answered or a voice message is listened to by using the terminal 120, the receiver 170B may be put close to a human ear to listen to a voice.

The microphone 170C, also referred to as a "mike" or a "mic", is configured to convert a sound signal into an electrical signal. When making a call or sending a voice message, the user may make a sound near the microphone 170C through the mouth of the user, to input a sound signal to the microphone 170C.

The headset jack 170D is configured to connect to a wired headset. The headset jack 170D may be a USB interface 130, or may be a 3.5 mm open mobile terminal platform (open mobile terminal platform, OMTP) standard interface or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The terminal 120 determines pressure strength based on a capacitance change. When a touch operation is performed on the display 194, the terminal 120 detects intensity of the touch operation by using the pressure sensor 180A. The terminal 120 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on the SMS message application icon, an instruction for creating a new SMS message is executed.

The gyroscope sensor 180B may be configured to determine a motion gesture of the terminal 120. In some embodiments, angular velocities of the terminal 120 around three axes (namely, axes x, y, and z) may be determined by using the gyroscope sensor 180B. The gyroscope sensor 180B may be configured to implement image stabilization during photographing. For example, when a shutter is pressed, the gyroscope sensor 180B detects an angle at which the terminal 120 jitters, calculates, based on the angle, a distance for which a lens module needs to compensate, and allows a lens to cancel the jitter of the terminal 120 through reverse motion, to implement image stabilization. The gyroscope sensor 180B may further be used in a navigation scenario or a somatic game scenario.

The barometric pressure sensor 180C is configured to measure barometric pressure. In some embodiments, the terminal 120 calculates an altitude based on a barometric pressure value measured by the barometric pressure sensor 180C, to assist in positioning and navigation.

The magnetic sensor 180D includes a Hall sensor. The terminal 120 may detect opening and closing of a flip cover by using the magnetic sensor 180D. In some embodiments, when the terminal 120 is a clamshell phone, the terminal 120 may detect opening and closing of a flip cover by using the magnetic sensor 180D. Further, a feature, for example, automatic unlocking of the flip cover is set based on a detected opening or closing state of the flip cover.

The acceleration sensor 180E may detect magnitude of accelerations in various directions (generally on three axes) of the terminal 120, and may detect magnitude and a direction of gravity when the terminal 120 is still. The acceleration sensor 180E may be further configured to identify a posture of the electronic device, and is used in an application, for example, switching between a landscape mode and a portrait mode or a pedometer.

The distance sensor 180F is configured to measure a distance. The terminal 120 may measure a distance by using infrared or laser. In some embodiments, in a photographing scenario, the terminal 120 may measure a distance by using the distance sensor 180F to implement quick focusing.

The optical proximity sensor 180G may include, for example, a light-emitting diode (LED) and an optical detector, for example, a photodiode. The light-emitting diode may be an infrared light-emitting diode. The terminal 120 emits infrared light to the outside by using the light-emitting diode. The terminal 120 detects infrared reflected light from a nearby object by using the photodiode. When sufficient reflected light is detected, it may be determined that there is an object near the terminal 120. When insufficient reflected light is detected, the terminal 120 may determine that there is no object near the terminal 120.

The ambient light sensor 180L is configured to sense ambient light brightness. The terminal 120 may adaptively adjust brightness of the display 194 based on the sensed ambient light brightness. The ambient light sensor 180L may also be configured to automatically adjust white balance during photographing. The ambient light sensor 180L may further cooperate with the optical proximity sensor 180G to detect whether the terminal 120 is in a pocket, to avoid an accidental touch.

The fingerprint sensor 180H is configured to collect a fingerprint. The terminal 120 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the terminal 120 executes a temperature processing policy based on the temperature detected by the temperature sensor 18J. For example, when the temperature reported by the temperature sensor 180J exceeds a threshold, the terminal 120 lowers performance of a processor located near the temperature sensor 180J, to reduce power consumption for thermal protection. In some other embodiments, when the temperature is lower than another threshold, the terminal 120 heats the battery 142 to avoid abnormal shutdown of the terminal 120 due to a low temperature. In some other embodiments, when the temperature is lower than still another threshold, the terminal 120 boosts an output voltage of the battery 142 to avoid abnormal shutdown due to a low temperature.

The touch sensor 180K is also referred to as a "touch component". The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of a touch event. A visual output related to the touch operation may be provided through the display 194. In some other embodiments, the touch sensor 180K may alternatively be disposed on a surface of the terminal 120 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal.

The button 190 includes a power button, a volume button, and the like. The button 190 may be a mechanical button, or may be a touch button. The terminal 120 may receive a button input, and generate a button signal input related to a user setting and function control of the terminal 120.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, and a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or detached from the SIM card interface 195, to implement contact with or separation from the terminal 120.

Certainly, the terminal 120 may further include another functional unit. This is not limited in embodiments of this application.

The following uses the architecture shown in FIG. 20 as an example to describe the service access method provided in embodiments of this application. Units in the following embodiments may have the components shown in FIG. 20. Details are not described again. It should be noted that, in embodiments of this application, names of messages exchanged between devices, names of parameters in the messages, or the like are merely examples. Another name may alternatively be used during specific implementation. In addition, actions, terms, and the like in embodiments of this application may be mutually referenced. This is not limited.

The foregoing service may include the account login authorization service, the real-name authentication service, the in-app payment service, the in-app advertisement service, the push service, and the like. In this embodiment of this application, the account login authorization service is used as an example for description.

The following describes in detail the service access method provided in embodiments of this application.

FIG. 21(1)A and FIG. 21(1)B are a part of a schematic flowchart of a service access method according to an embodiment of this application. FIG. 21(2)A to FIG. 21(2)C are another part of the schematic flowchart of the service access method according to an embodiment of this application. With reference to FIG. 21(1)A to FIG. 21(2)C, the method includes the following steps.

S2100: A terminal displays a second interface in response to receiving a first operation performed by a user on a first client on a first interface, where the second interface includes icons of a plurality of apps.

The first operation of the user may include a tap operation, a slide operation, a pressing operation, and the like. The tap operation may include a single-tap operation, a double-tap operation, and the like.

When the user needs to start a first app in the plurality of apps, the user may log in to the first client by using the terminal, and select the first app on an interface of the first client for starting. For example, it is assumed that the first client is a cloud game client, and the plurality of apps are a plurality of cloud game apps. The user may log in to the cloud game client on the terminal, and the terminal displays a second interface, namely, an interface of the cloud game client (for example, the interface 201 shown in FIG. 2). Icons of the plurality of cloud game apps (such as a first cloud game, a second cloud game, a third cloud game, and a fourth cloud game) are further displayed on the interface 201.

In this embodiment of this application, the second interface may further include a plurality of first controls, and an icon of each app corresponds to one first control, for example, an "Instant play" control shown in FIG. 2.

S2101: When a second operation performed by the user on the first app on the second interface is received, establish a communication channel between a third-party server proxy SDK and a third-party proxy service app.

S2101 may be specifically implemented as follows. S2111: When receiving the second operation performed by the user on the first app on the second interface, the terminal obtains information about the first app and information about the third-party proxy service app. Specifically, the terminal may obtain information about a virtual device in a cloud server from a resource scheduling server, for example, the information about the first app and the information about the third-party proxy service app. S2121: The terminal starts the third-party proxy service SDK embedded in the first client, and imports the obtained information about the first app and the obtained information about the third-party proxy service app on the cloud server into the third-party proxy service SDK. S2131: The terminal establishes the communication channel between the third-party server proxy SDK and the third-party proxy service app based on the information about the first app and the information about the third-party proxy service app. On the cloud server, the third-party service SDK embedded in the first app may schedule the third-party proxy service app. On the terminal, the third-party proxy service SDK embedded in the first client may schedule the third-party service app.

S2102: The terminal displays a third interface in response to receiving the second operation performed by the user on the first app on the second interface, where the third interface includes the first control used to invoke the third-party service app.

For example, an example of the foregoing cloud game login scenario is still used. When the user performs the second operation on the "Instant play" control shown in FIG. 2, the terminal may display an interface shown in (1) in FIG. 11, namely, the interface 1101 of the first cloud game app. A game picture of the first cloud game app and a login authorization control of the third-party application (for example, a control 1102 and a control 1103 that are shown in (1) in FIG. 11) are further displayed on the interface 1101.

For example, an example of the foregoing payment scenario is still used. When the user performs the second operation on a confirmation control shown in (1) in FIG. 15, the terminal can display the interface 1601 shown in (1) in FIG. 16. Third-party application payment information and a "Pay now" control 1602 are further displayed on the interface 1601.

The second operation of the user is the same as the first operation. Certainly, the second operation of the user may further include a trigger operation in another form, for example, an operation of sliding a cursor over an area in which the first app is located, or an operation of moving a cursor to an icon of the first app. This is not specifically limited in embodiments of this application.

In this embodiment of this application, the operation performed by the user on the first app on the second interface may be understood as the following several cases. Case 1: The user performs, on the second interface, an operation on an area in which the icon of the first app is located. Case 2: The user performs a trigger operation on a display interface of the icon of the first app, namely, a trigger operation on the display interface but not on the icon of the first app. Certainly, there may be other cases, which are not enumerated one by one herein.

In addition, the operation performed on the first app may be a direct operation performed by the user on the first app. For example, a finger of the user taps the icon of the first app or a first control corresponding to the first app. Alternatively, the operation may be an indirect operation performed by the user on the first app. For example, the user moves a cursor of a mouse to the icon of the first app.

In some embodiments, before S2102 is performed, the service access method provided in this embodiment of this application further includes the following steps.

S2103: The terminal displays a fourth interface in response to receiving the second operation performed by the user on the first app in the plurality of apps on the second interface. An interface of the first app is displayed on the fourth interface.

The interface of the first app is formed by audio and video streams returned by a first server corresponding to the first app.

S2103 may be specifically implemented as follows. S2113: The terminal receives the second operation performed by the user on the icon of the first app in the plurality of apps on the second interface. S2123: In response to receiving the second operation performed by the user on the first app, the first client on the terminal sends a start request of the first app to the first server corresponding to the first app on the cloud server. The start request carries an identifier of the first app. S2123: The first server generates an instruction based on the start request. S2133: The first server sends the instruction to the first app to start the first app. S2143: The first server returns audio and video streams (or referred to as an audio stream and a video stream, or referred to as audio and video streaming) to the first client of the terminal. S2153: After the first client of the terminal receives the audio and video streams, a screen of the terminal plays an audio and a video. In this case, the fourth interface of the first app, for example, a second interface of a first cloud game shown in (1) in FIG. 11, is displayed on a display interface of the terminal. The terminal continuously requests audio and video streams from the cloud server, and the cloud server continuously sends audio and video streams based on the request of the terminal.

After the interface of the first app is displayed on the fourth interface displayed by the terminal, the display interface of the terminal jumps from the fourth interface to the third interface. The interface of the first app and the first control used to invoke the third-party service app, for example, the interface 1101 shown in FIG. 11 and the control 1102 and the control 1103 on the interface 1101, are displayed on the third interface.

It can be learned that, in this embodiment, the cloud game app is used as an example, the user first starts the cloud game app, and can view general content of the cloud game app. After the content of the cloud game app is viewed, the cloud game app is logged in to. This complies with a normal game start procedure.

S2104: In response to receiving a third operation performed by the user on the first control on the third interface, the terminal indicates the first app running on the cloud server to send a first request to the third-party proxy service app by using the third-party service SDK embedded in the first app.

The first request is used to request the third-party proxy service app to perform an operation corresponding to the first control. The first control may include a login authorization control, an authentication control, a payment control, an advertisement control, or a push control.

Specifically, S2104 may be specifically implemented as follows. S2114: In response to receiving the third operation performed by the user on the first control (the control 1102 in (1) in FIG. 11 and a control 1502 in (1) in FIG. 15) on the third interface (for example, the interface 1101 shown in (1) in FIG. 11 or an interface 1501 shown in (1) in FIG. 15), the first client on the terminal sends an operation parameter of the third operation to the first server corresponding to the first app on the cloud server. Correspondingly, the first server on the cloud server receives the operation parameter of the third operation sent by the first client. S2124: The first server simulates, by using an operating system, a user operation corresponding to the operation parameter of the third operation, and generates an operation instruction. The first server sends the operation instruction to the first app. In this case, S2134: The first app generates the first request based on the operation instruction, and sends the first request to the third-party service SDK. The third-party service SDK sends the first request to the third-party proxy service app. S2144: The third-party proxy service app serializes the first request, and sends a serialized first request to the third-party proxy service SDK embedded in the first client on the terminal.

The operation parameter of the third operation is determined based on an operation performed by the user on the first control. For example, the user taps the first control. Correspondingly, an operation parameter of the user may be position coordinates of a tap on the screen of the terminal, a quantity of taps, or the like. The user presses the first control. Correspondingly, an operation parameter of the user may be duration in which the user presses the screen, position coordinates of the screen pressed by the user, or the like.

S2105: The terminal receives, by using the third-party proxy service SDK embedded in the first client, the serialized first request sent by the third-party proxy service app, and performs deserialization processing to obtain the first request.

S2106: The third-party proxy service SDK of the terminal invokes the third-party service app based on the first request, and the third-party service app performs the operation corresponding to the first control. Specifically, the third-party service app obtains a response result corresponding to the first request and feeds back the response result to the third-party proxy service SDK.

For example, the first control may include the login authorization control, the real-name authentication control, the payment control, the advertisement control, the push control, and the like.

S2106 may be specifically implemented as follows. S2116: The third-party proxy service SDK of the terminal invokes the third-party service app based on the first request. S2126: The terminal displays a fifth interface (for example, an interface 1201 shown in FIG. 12(1) or an interface 1601 shown in (1) in FIG. 16) of the third-party service app. The fifth interface includes information requested by the first app and a second control (the control 1202 and the control 1203 that are shown in FIG. 12(1), and the control 1602 shown in (1) in FIG. 16). The second control includes a consent control. In other words, the third-party proxy service SDK invokes an authorization interface of the third-party service app. In response to receiving a fifth operation performed by the user on the second control on the fifth interface, a response result corresponding to the first request is obtained. S2136: The third-party service app sends the response result to the third-party proxy service SDK.

For example, the first app is a cloud game app. When the user taps the control 1202 on the interface 1201 of the third-party service app shown in FIG. 12(1), the third-party service app authorizes the first cloud game app to log in to the first cloud game app by using login information of the third-party app. The third-party service app returns the login information to the third-party proxy service SDK. The third-party proxy service SDK obtains the login information of the third-party service app, and feeds back the login information to the third-party proxy service app, to return the login information to the first cloud game app for login.

It should be noted herein that, for ease of distinguishing whether an interface belongs to the cloud server or the terminal, in a mode in which "Show layout bounds" in developer options is enabled, a layout bound box in FIG. 12(1) is a dashed-line box shown in FIG. 12(2). It can be learned that an interface shown in FIG. 12(1) is of the terminal.

In this embodiment of this application, when the first cloud game app is logged in to for the first time, the third-party service app needs to pop up an authorization interface shown in FIG. 12(1). When the first cloud game app is not subsequently logged in to for the first time, the third-party service app may not pop up the authorization interface shown in FIG. 12(1). In other words, the third-party service app has been authorized, and the login information of the third-party service app is directly stored on the terminal to perform authorization again.

S2107: The third-party proxy service SDK receives the response result, and performs serialization processing on the response result, to obtain a serialized response result.

S2108: The third-party proxy service SDK sends the serialized response result to the third-party proxy service app. Correspondingly, the third-party proxy service app receives the serialized response result sent by the third-party proxy service SDK.

S2109: The third-party proxy service app performs deserialization processing on the serialized response result, to obtain the response result, and feeds back the response result to the first app by using the third-party service SDK. Correspondingly, the first app receives the response result fed back by the third-party service SDK.

S2110: The first app processes the response result and obtains a processing result. The first server sends the processing result of the first app to the first client on the terminal.

S2111: The terminal displays a sixth interface, where the processing result obtained by the first app is displayed on the sixth interface.

For example, the example of the foregoing cloud game login scenario is still used. When the user performs an operation on the control 1202 shown in FIG. 12(1), the display interface of the terminal jumps to the interface 501 shown in (1) in FIG. 5, namely, the game interface 501 of the first cloud game app.

For example, the example of the foregoing payment scenario is still used. When the user performs an operation on the control 1602 shown in (1) in FIG. 16, the terminal can display the interface 1701 of the third-party service app shown in (1) in FIG. 17. Third-party application payment completion information and the "Back to merchant" control 1702 are further displayed on the interface 1701. When the user performs an operation on the control 1702 shown in (1) in FIG. 17, the display interface of the terminal jumps to the payment completion interface 1801 of the first cloud game shown in (1) in FIG. 18.

For a specific implementation of this embodiment of this application, refer to the foregoing related content. Details are not described again in this embodiment of this application.

The solutions in the foregoing embodiments of this application may be combined under a premise that the solutions are not contradictory.

An embodiment of this application provides still another terminal. The terminal may include:

- a first receiving unit, configured to receive a first operation performed by a user on a first icon;
- a first display unit, configured to display a first interface in response to the first operation, where the first interface is an interface of a first application corresponding to the first icon, the first interface includes a first control used to invoke a second application, and the first application is an application running on a server;

a second receiving unit, configured to: receive a second operation performed by the user on the first control, where the second operation is responded to, and the second operation indicates the first application to send a first request to the terminal;

a first module, configured to receive the first request through a first communication channel, where the first communication channel is a communication channel between the first module and a server; and an invoking unit, configured to invoke, based on the first request, a second application to implement a function corresponding to the first control, where the second application is an application on the terminal.

In some implementations, the server is provided with a second module. The first channel is a communication channel between the first module and the second module.

In some implementations, the terminal further includes:

an establishing unit, configured to establish the communication channel.

In an implementation, the establishing unit includes:

a first obtaining subunit, configured to obtain information about the first application and information about the second module in response to the first operation; and an establishing subunit, configured to establish the communication channel based on the information about the first application and the information about the second module.

In an implementation, the first request includes a login request, a real-name authentication request, a payment request, an advertisement request, or a push request.

In an implementation, the first request includes the login request. The invoking unit includes:

a first display subunit, configured to display, by the terminal, a second interface based on the login request, where the second interface is an interface of the second application, the second interface includes a second control, and the second control is used to authorize to log in to the first application by using an account of the second application;

a first receiving subunit, configured to receive a third operation performed by the user on the second control; and a second obtaining subunit, configured to obtain, in response to the third operation, a response result fed back by the second application based on the login request.

In some implementations, the terminal further includes:

a first module, configured to send the response result to the server through the first communication channel, where the server is configured to: obtain interface information of logging in to the first application based on the response result, and feed back the interface information to the terminal; and a third receiving unit, configured to receive and display the interface information fed back by the server.

In some implementations, the first request includes the payment request. The invoking unit includes:

a first display subunit, configured to display, by the terminal, a third interface based on the payment request, where the second interface is an interface of the second application, the second interface includes a third control, and the third control is used to authorize payment that is based on order information of the first application;

a second receiving subunit, configured to receive a fourth operation performed by the user on the third control; and a third obtaining subunit, configured to obtain, in response to the fourth operation, a payment result fed back by the second application based on the payment request.

In an implementation, the third obtaining subunit is further configured to:

display a fourth interface of the second application in response to the fourth operation, where the fourth interface includes a payment result of the second application and a fourth control used to return to the first application;

receive a fifth operation performed by the user on the fourth control; and display a fifth interface of the first application in response to the fifth operation, where the payment result is displayed on the fifth interface.

In some implementations, the terminal further includes:

a second display unit, configured to display the fifth interface in response to the first operation, where an interface of the first application is displayed on the fifth interface, and video content of the first application is displayed on the interface of the first application.

In some implementations, the terminal includes:

a sending unit, configured to send operation information of the second operation to the server in response to the second operation.

The server is configured to: simulate an operation of the user based on the operation information of the second operation, and send an operation instruction to the first application. The operation instruction indicates the first application to send the first request to the terminal.

In some implementations, the first module is a third-party service proxy software development kit. The second module is a third-party proxy service application.

An embodiment of this application provides a system. The system may include:

a terminal, configured to: receive a first operation performed by a user on a first icon; display a first interface in response to the first operation, where the first interface is an interface of a first application corresponding to the first icon, the first interface includes a first control used to invoke a second application, and the first application is an application running on a server; receive a second operation performed by the user on the first control; and send operation information of the second operation to the server in response to the second operation; and a server, configured to: receive the operation information of the second operation, and generate a first operation instruction, where the first operation instruction indicates the first application to send a first request to the terminal.

The terminal is further configured to: receive the first request through a first communication channel by using a first module of the terminal, where the first communication channel is a communication channel between the first module and the server; and invoke, based on the first request, the second application to implement a function corresponding to the first control, where the second application is an application on the terminal.

In some implementations, the server is provided with a second module. The first channel is a communication channel between the first module and the second module.

In some implementations, the terminal is further configured to establish the communication channel.

In some implementations, the terminal is further configured to:

in response to the first operation, obtain information about the first application and information about the second module; and establish the communication channel based on the information about the first application and the information about the second module.

In some implementations, the first request includes a login request, a real-name authentication request, a payment request, an advertisement request, or a push request.

In some implementations, the first request includes the login request. The terminal is further configured to:

display a second interface based on the login request, where the second interface is an interface of the second application, the second interface includes a second control, and the second control is used to authorize to log in to the first application by using an account of the second application;

receive a third operation performed by the user on the second control; and obtain, in response to the third operation, a response result fed back by the second application based on the login request.

In some implementations, the terminal is further configured to send the response result to the server through the first communication channel by using the first module of the terminal.

The server is further configured to: receive, by the first application, the response result; log in to the first application based on the response result, and display an interface; and send, to the terminal, interface information of logging in to the first application.

The terminal is further configured to: receive and display the interface information sent by the server.

In some implementations, the first request includes the payment request. The terminal is further configured to:

display a third interface based on the payment request, where the second interface is an interface of the second application, the second interface includes a third control, and the third control is used to authorize payment that is based on order information of the first application;

receive a fourth operation performed by the user on the third control; and obtain, in response to the fourth operation, a payment result fed back by the second application based on the payment request.

In some implementations, the terminal is further configured to: display a fourth interface of the second application in response to the fourth operation, where the fourth interface includes the payment result of the second application and a fourth control used to return to the first application; receive a fifth operation performed by the user on the fourth control; and send operation information of the fifth operation to the server in response to the fifth operation.

The server is further configured to: receive the operation information of the fifth operation, and generate a second operation instruction, where the second operation instruction indicates the first application to display the payment result; and send, to the terminal, interface information that carries the payment result and that is of the first application.

The terminal is further configured to: receive the interface information, and display a fifth interface of the first application, where the payment result is displayed on the fifth interface.

In some implementations, the terminal is further configured to send an obtaining request to the server in response to the first operation.

The server is further configured to send the interface information of the first application to the terminal based on the obtaining request.

The terminal is further configured to display the fifth interface. An interface of the first application is displayed on the fifth interface. Video content of the first application is displayed on the interface of the first application.

In some implementations, the first module is a third-party service proxy software development kit. The second module is a third-party proxy service application.

An embodiment of this application further provides a computer-readable storage medium, including instructions. When the instructions are run on a computer, the computer is enabled to perform any one of the foregoing methods.

An embodiment of this application further provides a computer program product including instructions. When the computer program product runs on a computer, the computer is enabled to perform any one of the foregoing methods.

An embodiment of this application further provides a chip. The chip includes a processor and an interface circuit. The interface circuit is coupled to the processor. The processor is configured to run a computer program or instructions, to implement the foregoing methods. The interface circuit is configured to communicate with another module other than the chip.

In descriptions of this application, unless otherwise specified, "/" means "or". For example, A/B may indicate A or B. The term "and/or" in this specification describes only an association relationship between associated objects and indicates that there may be three relationships. For example, A and/or B may indicate the following three cases: Only A exists, both A and B exist, and only B exists. In addition, "at least one" means one or more, and "a plurality of" means two or more. Terms such as "first" and "second" do not limit a quantity and an execution sequence, and the terms such as "first" and "second" do not indicate a definite difference.

In the descriptions of this application, words such as "example" or "for example" are used to represent giving an example, an illustration, or a description. Any embodiment or design scheme described as an "example" or "for example" in embodiments of this application should not be explained as being more preferred or having more advantages than another embodiment or design scheme. Exactly, the word such as "example" or "for example" is intended to present a related concept in a specific manner.

The foregoing descriptions of the foregoing implementations allow a person skilled in the art to clearly understand that, for the purpose of convenient and brief description, division into the foregoing functional modules is used as an example for illustration. During actual application, the foregoing functions can be allocated to different modules and implemented based on a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the division into the modules or units is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed to different places. Some or all of the units may be selected based on an actual requirement, to achieve the objectives of the solutions of embodiments.

In addition, functional units in embodiments of this application may be integrated into one processing unit, each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions in embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in embodiments of this application. The storage medium includes various media that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A service access method, comprising:

receiving, by a terminal, a first operation performed by a user on a first icon;

displaying, by the terminal, a first interface in response to the first operation, wherein the first interface is an interface of a first application corresponding to the first icon, the first interface comprises a first control used to invoke a second application, and the first application is an application running on a server;

receiving, by the terminal, a second operation performed by the user on the first control;

responding to the second operation, wherein the second operation indicates the first application to send a first request to the terminal;

receiving, by a first module of the terminal, the first request through a first communication channel, wherein the first communication channel is a communication channel between the first module and the server; and invoking, by the terminal based on the first request, the second application to implement a function corresponding to the first control, wherein the second application is an application on the terminal.

2. The method according to claim 1, wherein the server is provided with a second module, and the first communication channel is a communication channel between the first module and the second module.

3. The method according to claim 2, further comprising, after displaying, by the terminal, the first interface in response to the first operation:

establishing, by the first module of the terminal, the first communication channel with the server.

4. The method according to claim 3, wherein establishing, by the terminal, the communication channel comprises:

obtaining, by the terminal, information about the first application and information about the second module in response to the first operation; and establishing, by the terminal, the communication channel based on the information about the first application and the information about the second module.

5. The method according to claim 3, wherein the first request comprises a login request, a real-name authentication request, a payment request, an advertisement request, or a push request.

6. The method according to claim 5, wherein:

the first request comprises the login request, and invoking, by the terminal based on the first request, the second application to implement the function corresponding to the first control comprises:

displaying, by the terminal, a second interface based on the login request, wherein the second interface is an interface of the second application, the second interface comprises a second control, and the second control is used to authorize to log in to the first application by using an account of the second application, receiving, by the terminal, a third operation performed by the user on the second control, and obtaining, by the terminal in response to the third operation, a response result fed back by the second application based on the login request.

7. The method according to claim 6, further comprising, after obtaining, by the terminal in response to the third operation, the response result fed back by the second application based on the login request:

sending, by the first module of the terminal, the response result to the server through the first communication channel, wherein the server is configured to obtain login interface information to the first application based on the response result, and feed back the interface information to the terminal;

receiving, by the terminal, the interface information fed back by the server; and displaying, by the terminal, a sixth interface based on the interface information.

8. The method according to claim 5, wherein:

the first request comprises the payment request; and invoking, by the terminal based on the first request, the second application to implement the function corresponding to the first control comprises:

displaying, by the terminal, a third interface based on the payment request, wherein the third interface is an interface of the second application, the third interface comprises a third control, and the third control is used to authorize payment that is based on order information of the first application, receiving, by the terminal, a fourth operation performed by the user on the third control, and obtaining, by the terminal in response to the fourth operation, a payment result fed back by the second application based on the payment request.

9. The method according to claim 8, wherein obtaining, by the terminal in response to the fourth operation, the payment result fed back by the second application based on the payment request comprises:

displaying, by the terminal, a fourth interface of the second application in response to the fourth operation, wherein the fourth interface comprises the payment result of the second application and a fourth control used to return to the first application;

receiving, by the terminal, a fifth operation performed by the user on the fourth control; and displaying, by the terminal, a fifth interface of the first application in response to the fifth operation, wherein the payment result is displayed on the fifth interface.

10. The method according to claim 9, further comprising, before displaying, by the terminal, the first interface in response to the first operation:

displaying, by the terminal, the fifth interface in response to the first operation, wherein an interface of the first application is displayed on the fifth interface, and video content of the first application is displayed on the interface of the first application.

11. A system, comprising:

a terminal, configured to:

receive a first operation performed by a user on a first icon, display a first interface in response to the first operation, wherein the first interface is an interface of a first application corresponding to the first icon, the first interface comprises a first control used to invoke a second application, and the first application is an application running on a server, receive a second operation performed by the user on the first control, send operation information of the second operation to the server in response to the second operation, receive a first request through a first communication channel by using a first module of the terminal, wherein the first communication channel is a communication channel between the first module and the server, and invoke, based on the first request, the second application to implement a function corresponding to the first control, wherein the second application is an application on the terminal; and the server, configured to:

receive the operation information of the second operation, and generate a first operation instruction, wherein the first operation instruction indicates the first application to send the first request to the terminal.

12. The system according to claim 11, wherein the first request comprises a login request, and the terminal is further configured to:

display a second interface based on the login request, wherein the second interface is an interface of the second application, the second interface comprises a second control, and the second control is used to authorize to log in to the first application by using an account of the second application;

receive a third operation performed by the user on the second control; and obtain, in response to the third operation, a response result fed back by the second application based on the login request.

13. The system according to claim 12, wherein:

the terminal is further configured to send the response result to the server through the first communication channel by using the first module of the terminal;

the server is further configured to:

receive the response result by using the first application, log in to the first application based on the response result, display an interface, and send, to the terminal, interface information of logging in to the first application; and the terminal is further configured to:

receive the interface information sent by the server, and display a sixth interface based on the interface information.

14. The system according to claim 12, wherein the first request comprises a payment request, and the terminal is further configured to:

display a third interface based on the payment request, wherein the third interface is an interface of the second application, the third interface comprises a third control, and the third control is used to authorize payment that is based on order information of the first application;

receive a fourth operation performed by the user on the third control; and obtain, in response to the fourth operation, a payment result fed back by the second application based on the payment request.

15. The system according to claim 14, wherein the terminal is further configured to:

display a fourth interface of the second application in response to the fourth operation, wherein the fourth interface comprises the payment result of the second application and a fourth control used to return to the first application, receive a fifth operation performed by the user on the fourth control, and send operation information of the fifth operation to the server in response to the fifth operation;

the server is further configured to:

receive the operation information of the fifth operation, and generate a second operation instruction, wherein the second operation instruction indicates the first application to display the payment result, and send, to the terminal, interface information that carries the payment result and that is of the first application; and the terminal is further configured to: receive the interface information, and display a fifth interface of the first application, wherein the payment result is displayed on the fifth interface.

16. A terminal configured to be used in a service access method, the terminal configured to:

receive a first operation performed by a user on a first icon;

display a first interface in response to the first operation, wherein the first interface is an interface of a first application corresponding to the first icon, the first interface comprises a first control used to invoke a second application, and the first application is an application configured to run on a server;

receive a second operation performed by the user on the first control;

respond to the second operation, wherein the second operation indicates the first application to send a first request to the terminal;

receive, by a first module of the terminal, the first request through a first communication channel, wherein the first communication channel is a communication channel between the first module and the server; and invoke, based on the first request, the second application to implement a function corresponding to the first control, wherein the second application is an application on the terminal.

17. The terminal according to claim 16, wherein the terminal is configured to establish the communication channel by:

obtaining information about the first application and information about a second module in response to the first operation; and establishing the communication channel based on the information about the first application and the information about the second module.

18. The terminal according to claim 16, wherein the first request comprises a login request, and the terminal is configured to invoke, based on the first request, the second application to implement the function corresponding to the first control by:

displaying a second interface based on the login request, wherein the second interface is an interface of the second application, the second interface comprises a second control, and the second control is used to authorize to log in to the first application by using an account of the second application;

receiving a third operation performed by the user on the second control; and obtaining, in response to the third operation, a response result fed back by the second application based on the login request.

19. The terminal according to claim 18, wherein the terminal is configured to, after obtaining, in response to the third operation, the response result fed back by the second application based on the login request:

send, by the first module of the terminal, the response result to the server through the first communication channel, wherein the server is configured to obtain interface information of logging in to the first application based on the response result, and feed back the interface information to the terminal;

receive the interface information fed back by the server; and display a sixth interface based on the interface information.

20. The terminal according to claim 16, wherein the first request comprises a payment request, and the terminal is further configured to invoke, based on the first request, the second application to implement the function corresponding to the first control by:

displaying a third interface based on the payment request, wherein the third interface is an interface of the second application, the third interface comprises a third control, and the third control is used to authorize payment that is based on order information of the first application;

receiving a fourth operation performed by the user on the third control; and obtaining in response to the fourth operation, a payment result fed back by the second application based on the payment request.

21. The terminal according to claim 20, wherein the terminal is configured to obtain, in response to the fourth operation, the payment result fed back by the second application based on the payment request by:

displaying, by the terminal, a fourth interface of the second application in response to the fourth operation, wherein the fourth interface comprises the payment result of the second application and a fourth control used to return to the first application;

receiving, by the terminal, a fifth operation performed by the user on the fourth control; and displaying, by the terminal, a fifth interface of the first application in response to the fifth operation, wherein the payment result is displayed on the fifth interface.

* * * * *